United States Patent [19]

Shear

[11] Patent Number: 5,410,598
[45] Date of Patent: Apr. 25, 1995

[54] DATABASE USAGE METERING AND PROTECTION SYSTEM AND METHOD

[75] Inventor: Victor H. Shear, Bethesda, Md.

[73] Assignee: Electronic Publishing Resources, Inc., Chevy Chase, Md.

[21] Appl. No.: 311,311

[22] Filed: Sep. 27, 1994

Related U.S. Application Data

[63] Continuation of Ser. No. 261,018, Jun. 16, 1994, abandoned, which is a continuation of Ser. No. 161,868, Dec. 6, 1993, abandoned, which is a continuation of Ser. No. 983,260, Nov. 30, 1992, abandoned, which is a continuation of Ser. No. 679,191, Apr. 2, 1991, abandoned, which is a continuation of Ser. No. 562,996, Aug. 6, 1990, Pat. No. 5,050,213, which is a continuation of Ser. No. 310,938, Feb. 16, 1989, Pat. No. 4,977,594, which is a continuation of Ser. No. 918,109, Oct. 14, 1986, Pat. No. 4,827,508.

[51] Int. Cl.6 .................... H04L 9/32; G06F 13/14
[52] U.S. Cl. ................................. 380/4; 380/23; 380/25; 380/49; 380/50; 327/525
[58] Field of Search ................ 380/3, 4, 9, 16, 23, 380/25, 49, 50, 54; 327/525

[56] References Cited

U.S. PATENT DOCUMENTS

| | | | |
|---|---|---|---|
| 3,573,747 | 4/1971 | Adams et al. | 364/408 |
| 3,609,697 | 9/1971 | Blevins | 364/200 |
| 3,796,830 | 3/1974 | Smith | 380/37 |
| 3,798,359 | 3/1974 | Feistel | 380/37 |
| 3,798,360 | 3/1974 | Feistel | 380/37 |
| 3,798,605 | 3/1974 | Feistel | 380/25 |
| 3,806,882 | 4/1974 | Clarke | 395/425 |
| 3,829,833 | 8/1974 | Freeny, Jr. | 340/825.31 |
| 3,906,448 | 9/1975 | Henriques | 371/27 |
| 3,911,397 | 10/1975 | Freeny, Jr. | 235/382 |
| 3,924,065 | 12/1975 | Freeny, Jr. | 375/47 |
| 3,931,504 | 1/1976 | Jacoby | 395/575 |
| 3,946,220 | 3/1976 | Brobeck et al. | 364/405 |
| 3,956,615 | 5/1976 | Anderson et al. | 380/24 |
| 3,958,081 | 5/1976 | Ehrsam et al. | 380/29 |
| 3,970,992 | 7/1976 | Boothroyd et al. | 395/155 |

(List continued on next page.)

FOREIGN PATENT DOCUMENTS

| | | | |
|---|---|---|---|
| 900479 | 12/1984 | Belgium. | |
| 0084441 | 7/1983 | European Pat. Off. | G06F 13/00 |
| 0135422 | 3/1985 | European Pat. Off. | G06F 12/14 |
| 57-726 | 5/1982 | Japan | G06F 1/00 |
| 2136175 | 9/1984 | United Kingdom | H03K 13/24 |
| WO8502310 | 5/1985 | WIPO | H04L 9/00 |
| WO85/03584 | 8/1985 | WIPO | G06F 11/30 |

OTHER PUBLICATIONS

*Proceedings of the IEEE,* vol. 67, No. 3, Mar. 1979, Privacy and Authentication: An Introduction to Cryptography, Whitfield Diffie and Martin E. Hellman, pp. 397–427.

(List continued on next page.)

Primary Examiner—Bernarr E. Gregory
Attorney, Agent, or Firm—Nixon & Vanderhye

[57] ABSTRACT

A "return on investment" digital database usage metering, billing, and security system includes a hardware device which is plugged into a computer system bus (or into a serial or other functionally adequate connector) and a software program system resident in the hardware device. One or more databases are encrypted and stored on a non-volatile mass storage device (e.g., an optical disk). A tamper-proof decrypting device and associated controller decrypts selected portions of the stored database and measures the quantity of information which is decrypted. This measured quantity information is communicated to a remote centralized billing facility and used to charge the user a fee based on database usage. A system may include a "self-destruct" feature which disables system operation upon occurrence of a predetermined event unless the user implements an "antidote"—instructions for implementing the antidote being given to him by the database owner only if the user pays his bill. Absolute database security and billing based on database usage are thus provided in a system environment wherein all database access tasks are performed at the user's site. Moreover, a free market competitive environment is supported because literary property royalties can be calculated based on actual data use.

105 Claims, 5 Drawing Sheets

U.S. PATENT DOCUMENTS

| | | | |
|---|---|---|---|
| 4,048,619 | 9/1977 | Forman, Jr. et al. | 370/71 |
| 4,071,911 | 1/1978 | Mazur | 364/130 |
| 4,112,421 | 9/1978 | Freeny, Jr. | 342/457 |
| 4,120,030 | 10/1978 | Johnstone | 380/4 |
| 4,168,396 | 9/1979 | Best | 380/4 |
| 4,196,310 | 4/1980 | Forman et al. | 380/46 |
| 4,200,913 | 4/1980 | Kuhar et al. | 364/900 |
| 4,209,787 | 6/1980 | Freeny, Jr. | 342/457 |
| 4,217,588 | 8/1980 | Freeny, Jr. | 342/458 |
| 4,220,991 | 9/1980 | Hamano et al. | 364/405 |
| 4,232,193 | 11/1980 | Gerard | 380/36 |
| 4,232,317 | 11/1980 | Freeny, Jr. | 342/464 |
| 4,236,217 | 11/1980 | Kennedy | 364/483 |
| 4,253,157 | 2/1981 | Kirschner et al. | 364/900 |
| 4,262,329 | 4/1981 | Bright et al. | 380/4 |
| 4,265,371 | 5/1981 | Desai et al. | 222/639 |
| 4,270,182 | 5/1981 | Asija | 364/419 |
| 4,278,837 | 7/1981 | Best | 380/4 |
| 4,305,131 | 12/1981 | Best | 364/521 |
| 4,306,289 | 12/1981 | Lumley | 380/4 |
| 4,319,079 | 3/1982 | Best | 380/4 |
| 4,323,921 | 4/1982 | Guillou | 380/18 |
| 4,328,544 | 5/1982 | Baldwin et al. | 364/405 |
| 4,337,483 | 6/1982 | Guillou | 380/20 |
| 4,361,877 | 11/1982 | Dyer et al. | 364/900 |
| 4,375,579 | 3/1983 | Davida et al. | 380/28 |
| 4,433,207 | 2/1984 | Best | 380/4 |
| 4,434,464 | 2/1984 | Suzuki et al. | 364/200 |
| 4,442,486 | 4/1984 | Mayer | 364/200 |
| 4,446,519 | 5/1984 | Thomas | 364/200 |
| 4,454,594 | 6/1984 | Heffron et al. | 364/900 |
| 4,458,315 | 7/1984 | Uchenick | 380/4 |
| 4,462,076 | 7/1984 | Smith, III | 364/200 |
| 4,462,078 | 7/1984 | Ross | 364/200 |
| 4,471,163 | 9/1984 | Donald et al. | 380/4 |
| 4,484,217 | 11/1984 | Block et al. | 358/84 |
| 4,494,156 | 1/1985 | Kadison et al. | 360/48 |
| 4,513,174 | 4/1985 | Herman | 380/4 |
| 4,528,588 | 7/1985 | Lofberg | 358/349 |
| 4,528,643 | 7/1985 | Freeny, Jr. | 364/468 |
| 4,553,252 | 11/1985 | Egendorf | 377/15 |
| 4,562,306 | 12/1985 | Chou et al. | 380/4 |
| 4,562,495 | 12/1985 | Bond et al. | 360/78.04 |
| 4,577,289 | 3/1986 | Comerford et al. | 364/900 |
| 4,584,641 | 4/1986 | Guglielmino | 364/200 |
| 4,588,991 | 5/1986 | Atalla | 380/4 |
| 4,589,064 | 5/1986 | Chiba et al. | 364/200 |
| 4,593,353 | 6/1986 | Pickholtz | 364/200 |
| 4,593,376 | 6/1986 | Volk | 364/900 |
| 4,595,950 | 6/1986 | Lofberg | 380/5 |
| 4,597,058 | 6/1986 | Izumi et al. | 364/900 |
| 4,634,807 | 1/1987 | Chorley et al. | 380/4 |
| 4,644,493 | 2/1987 | Chandra et al. | 364/900 |
| 4,646,234 | 2/1987 | Tolman et al. | 364/200 |
| 4,652,990 | 3/1987 | Pailen et al. | 364/200 |
| 4,658,093 | 4/1987 | Hellman | 380/25 |
| 4,670,857 | 6/1987 | Rackman | 380/4 |
| 4,677,434 | 6/1987 | Fascenda | 380/23 |
| 4,680,731 | 7/1987 | Izumi et al. | 364/900 |
| 4,683,553 | 7/1987 | Mollier | 380/4 |
| 4,685,056 | 8/1987 | Barnsdale et al. | 364/200 |
| 4,688,169 | 8/1987 | Joshi | 364/200 |
| 4,691,350 | 9/1987 | Kleijne et al. | 380/3 |
| 4,696,034 | 9/1987 | Wiedemer | 380/16 |
| 4,701,846 | 10/1987 | Ikeda et al. | 364/200 |
| 4,712,238 | 12/1987 | Gilhousen et al. | 380/20 |
| 4,713,753 | 12/1987 | Boebert et al. | 364/200 |
| 4,740,890 | 4/1988 | William | 364/200 |
| 4,747,139 | 5/1988 | Taaffe | 380/44 |
| 4,757,533 | 7/1988 | Allen et al. | 380/25 |
| 4,768,087 | 8/1988 | Taub et al. | 358/84 |
| 4,791,565 | 12/1988 | Dunham et al. | 364/200 |
| 4,827,508 | 5/1989 | Shear | 380/4 |
| 4,977,594 | 12/1990 | Shear | 380/4 |
| 5,010,571 | 4/1991 | Katznelson | 380/4 |
| 5,103,392 | 4/1992 | Mori | 395/725 |

OTHER PUBLICATIONS

*Digest of Papers, VLSI: New Architectural Horizons,* Feb. 1980, *Preventing Software Piracy With Crypto–Microprocessors,* Robert M. Best, pp. 466–469.

*IEEE Transactions on Information Theory,* vol. 22, No 6, Nov. 1976, *New Directions in Cryptography,* Whitfield Diffie and Martin E. Hellman, pp. 644–651.

Kent, "Protecting Externally Supplied Software In Small Computers" (MIT/LCS/TR–255 Sep. 1980).

"Encapsulation: An Approach to Operating System Security", Bisbey, II et al. Oct. 1973, pp. 666–675.

"Encryption Methods in Data Networks", Blom et al, Ericsson Technics, No. 2, 1978; Stockholm, Sweden.

First CII Honeywell Bull International Symposium on Computer Security and Confidentiality, Jan. 26–28, 1981, Conference Text, pp. 1–21.

Codercard, Spec. Sheet—Basic Coder Subsystem, No Date Given.

"Micro Card"—Micro Card Technologies, Inc., Dallas, Texas, No Date Given.

"A Method Of Software Protection Based on the Use of Smart Cards and Cryptographic Techniques", Scnaumueller-Bichl et al, No Date Given.

I "The New Alexandria" No. 1, Alexandria Institute, pp. 1–12, Jul.–Aug. (1986).

Denning et al, "Data Security", 11 *Computing Surveys* No. 3, Sep. 1979.

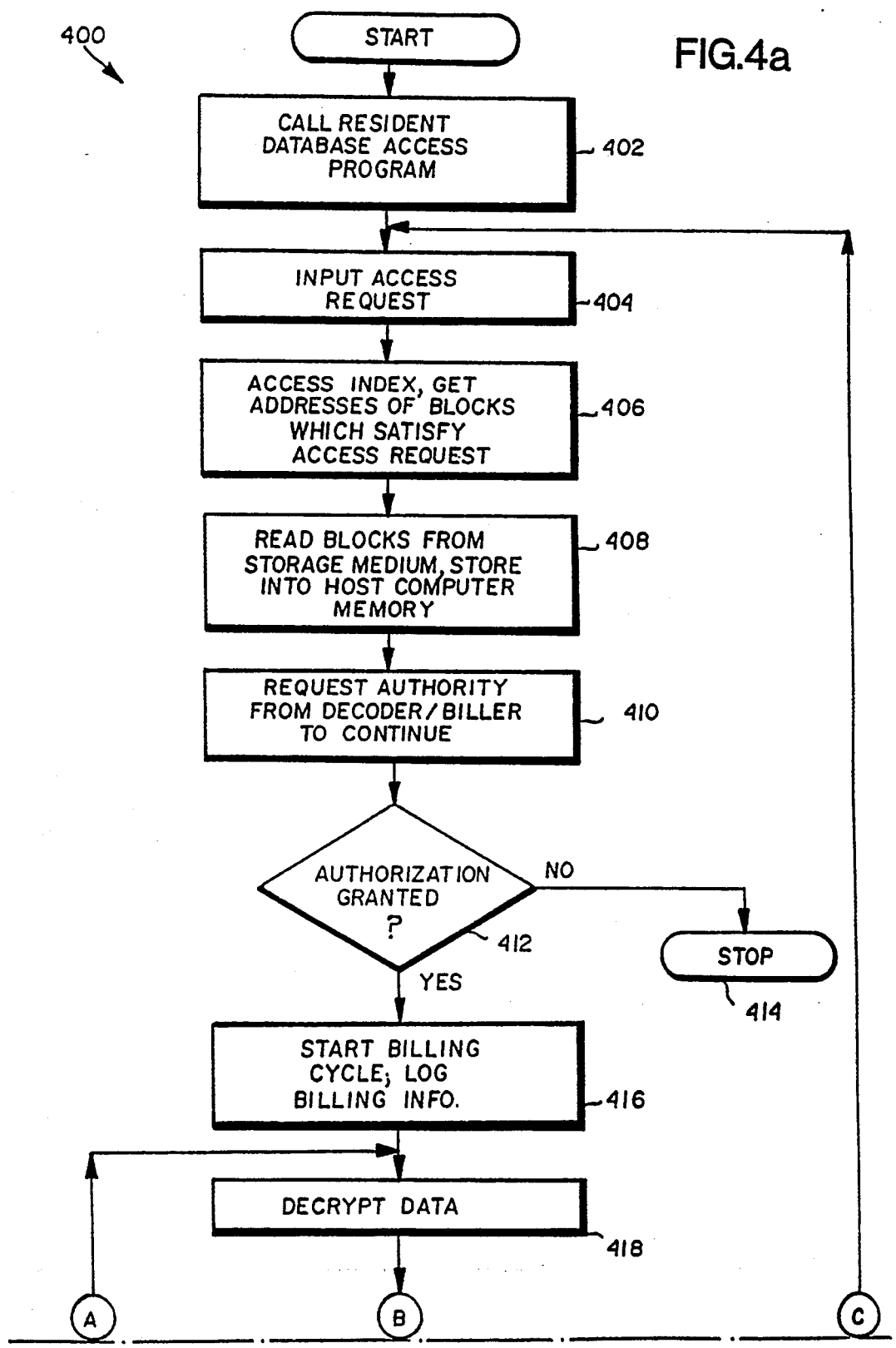

DATABASE USAGE METERING AND PROTECTION SYSTEM AND METHOD

This is a continuing application of application Ser. No. 08/261,018 filed Jun. 16, 1994, now abandoned which is a continuing application of application Ser. No. 08/161,868 filed Dec. 6, 1993, now abandoned, which is a continuing application of application Ser. No. 07/983,260 filed Nov. 30, 1992, now abandoned, which is a continuing application of application Ser. No. 07/679,191 filed Apr. 2, 1991, now abandoned, which is a continuing application of application Ser. No. 07/562,996 filed Aug. 6, 1990, now U.S. Pat. No. 5,050,213, which is a continuing application of application Ser. No. 07/310,938 filed Feb. 16, 1989, now U.S. Pat. No. 4,977,594, which is a continuing application of application Ser. No. 07/918,109 filed Oct. 14, 1986, now U.S. Pat. No. 4,827,508.

The present invention relates to regulating usage of a computer database. More particularly, the invention relates to techniques for preventing unauthorized use of an electronic digital information database and for measuring the utilization of the database by authorized users.

Information conveyed in electronic form is rapidly becoming the most valuable of commodities. Electronic digital databases now exist for a variety of different applications and fields of endeavor, and many businesses presently rely heavily on their ability to access those databases.

The value of being able to instantaneously, electronically access important, accurate information cannot be overestimated. Many of our daily activities depend on our ability to obtain pertinent information in a timely fashion. While printed publications and electronic mass media together fulfill most of the average person's informational needs and most often are the only source for full-text reference information, just about any effort to access information can benefit from the vast information handling capabilities of the computer. In today's fast-paced world, we quickly come to insist on and rely upon the most thorough and up-to-the-minute information available—often made possible only by electronic data processing and informational management technology. On-line, public databases, now a two billion dollar a year industry, are a case in point.

As the "information explosion" continues its course, more and more people will become dependent on electronically-stored information and people will continue to be willing to pay premium prices (when necessary) for access to and use of such information because of its usefulness and value to them. Currently, the principal resource for large, electronic information data bases are on-line (public) data base services such as Dialog Information Services, Mead Data Central, Dow Jones Information Services, Source, Compuserve, and many others. Most on-line data bases are abstract and/or bibliographic in content, and many are used primarily to access the document locations of specified information, rather than for the recall of the original document full-text.

Historically, personal computers have been used primarily for word-processing, modeling, and, to a lesser extent, the structured data base management of records. Technology that enables the user of, for example, a personal computer to search for, locate, and retrieve topically related full-text information from vast full-text data bases would be extremely useful and valuable.

The only viable way to make some kinds of information (e.g., information which must be constantly updated) available is to maintain centralized databases and permit users to access the centralized databases through telephone lines or other communication means. Until very recently, this method has been the most cost-effective way to offer access to electronic databases. Access to a centralized database can be controlled relatively easily, and users can be charged for using a centralized database in accordance with parameters which are relatively easy to measure (i.e., the amount of time the user is connected to the database computer, the number and type of tasks the user requests, etc.). Moreover, because the database never leaves the central computer (each user is typically given access to only small portions of the database at a time), there is no danger of someone making unauthorized copies of the database.

However, centralized databases have important disadvantages. For example, it takes a relatively long time to manipulate information in a centralized database due to the relatively slow data transmission rates of standard communications channels and because the centralized database computer typically shares its resources among hundred or thousands of users at once. This can be a serious drawback if the user wishes to access a large volume of information or Wishes to perform particularly complex data manipulation tasks. Also, it may take a long time during periods of peak database usage before communication can be successfully established with a centralized database computer, decreasing the utilization of the database and causing some users to become frustrated. Further disadvantages include the expense of establishing long-distance communications paths (e.g., WATS telephone line maintenance charges, long-distance direct-dial telephone charges, satellite channel costs, etc.) between distant user terminals and the central database computer, and the reliability problems associated with such communications paths. Moreover, the centralized computer facility needed to handle the access requests of many distant users simultaneously is extremely expensive to purchase and maintain.

With the advent of cheaper computer hardware and new, high density information storage devices (such as the optical disk and the bubble memory), it has become practical to give users their own copies of large and complex databases and permit users to access and manipulate the databases using their own computer equipment. Optical disks are capable of storing vast amounts of information at relatively low cost, are small enough to be sent through the mails, and can provide data at extremely rapid rates. Bubble memory devices provide some similar capabilities.

CD and related digital disk drives can currently store up to 225,000 pages of full-text information per removable diskette and can inexpensively maintain in excess of 1,800,000 pages of text simultaneously on-line. These technologies are ideal for personal computer information base libraries. CD drives use removable compact disks (essentially identical to an audio compact disk) the very low cost and enormous storage capacity has been predicted to result in an installed base of as large as one million drives to 10 million drives (including non-CD but related optical storage technology) by the end of 1990. Owners of "CD-ROM" and related drives will create an enormous demand for both lexical software and electronically published information base products.

Mitsubishi Research Institute of Japan, for example, estimates that between 8,000 and 12,000 different CD-ROM publication titles will be on the market by the end of 1990.

Hence, it is now possible to store some databases on transportable, high-density information storage devices, and simply mail each user his own copy of the databases. The user can in this way be given exclusive access, via his own computer system, to local, on-site databases. Rapid access time is provided because access to the databases is exclusive rather than shared, and because data can be read from the database storage device by local high-speed I/O devices and transmitted over local high-speed I/O channels or networks. The stored databases can be updated periodically if necessary by sending the user storage devices containing a new version of (or new portions of) the databases.

It is very expensive to build a database. One way to recover the costs of constructing and maintaining a database ("Return On Investment", or ROI) is to charge a flat subscription or access fee to each user subscribing to use the database. If this is the only billing method used, however, infrequent users of the database may be discouraged from subscribing, because they would be asked to pay the the same cost a frequent user pays. Thus, many database owners charge subscribers a nominal subscription fee, and then periodically (e.g., monthly) charge users a fee calculated in accordance with the amount the user has used the database.

While it is easy to measure the amount someone uses a centralized database (e.g., simply time each access session length and store the time information with user identification information), there is no convenient way to measure the usage of a database residing on a user's own computer, or to convey such usage information to the owner of the database. Techniques are known for automatically, electronically measuring consumption of a commodity such as electricity, water of gas, storing the measurements in a memory device, and periodically downloading the stored measurements over a telephone line to a central billing computer. Unfortunately, these known techniques are not readily adaptable to database usage metering, and moreover, are neither secure enough nor provide the security against database piracy that most database owners demand.

The prevention of unauthorized database usage becomes a huge problem whenever a stored-database leaves the possession and control of the database owner. Computer program manufacturers lose millions of dollars each year to "pirates" who make unauthorized copies of software and distribute those copies for profit. Complex databases are often even more expensive to produce than programs, so that potential contributors of data base properties, as well as database owners themselves, may be extremely hesitant to permit electronic copies of their properties or databases to leave their control unless they can be absolutely sure no unauthorized copies will be made. The copyright laws and contractual licensing agreements may deter, but will not prevent, unauthorized use and copying of database.

SUMMARY OF THE INVENTION

The present invention provides a database access system and method at a user site which permits authorized users to access and use the database and absolutely prevents unauthorized database use and copying. The present invention also provides a facility for measuring usage of the on-site database for the purpose of billing the user according to the amount he has used the database, and for periodically conveying the measured usage information to the database owner (or his agent)—while preventing the user from tampering with the measured usage information.

The invention solves fundamental media based electronic publishing issues including:

Security of the information base. The present invention provides a code/decode Interlock System which includes both software and a tamper proof hardware module that prevents unauthorized and/or unmetered use of a protected information base. The present invention also supports a multi-level coded security access system limiting access to various portions of a data base only to those individuals possessing the proper security code(s); and Ascertaining the degree of usage of the information base. The present invention stores, in one of several alternative forms of non-volatile memory, the dates and times that any files (or documents, sections, properties, etc.) are accessed and also records the amount of information read from each file into memory by the user.

With the present invention, a CD-ROM disk, for example, might contain all issues of 10 separate publications (technical, medical, business, etc. ) going back for five years. Each publisher would be able to set the price for the use of its publication or publications and each publisher could then receive a "copyright royalty" return-on-investment based on the actual customer usage of the publishers' products. Therefore, publishers contributing more important, popular or costly to develop lexical information base properties could earn revenues commensurate with the market demands and pricing strategies for their products.

The present invention eliminates the necessity of determining how much of the net revenue of a CD information base product each contributing publisher should receive (currently an issue of considerable concern to publishers). The present invention also ensures the data security of information bases—a critical, frequently voiced, and previously unanswered problem causing considerable publisher anxiety. It would be quite difficult (requiring a high level of specialized expertise and costly high-powered computers) to "break" the hardware/software data security system provided by the present invention and copy material without being charged an appropriate fee.

Publishers can license their products at an exceptionally low initial cost to customers (i.e. for a $25.00 initial fee instead of a $1,000.00 or more annual fee). Low initial licensing fees would result from the usage auditing capability of the present invention and would allow new clients to experiment with the product at little or no risk. Similarly, customers who anticipate a low level usage of a given information base product may find the lower costs of a usage based fee schedule a practical and affordable justification to acquire a product that would otherwise not be purchased.

In sum, the present invention will:

1. Significantly accelerate market penetration of electronically published products due to substantially lower initial license costs;

2. Greatly enhance the ultimate market penetration of CD published products by making CD publications affordable to a much large body of customers; and 3. Produce higher ultimate revenues per published disk from those customers who would otherwise have purchased a costlier version of the database product.

The security protection provided by the present invention will give publishers significant advantages in securing exclusive contracts for important publishing information base properties, since the invention provides the information base property contributors with:

1. Vastly superior copy protection security;
2. Ultimately greater revenue;
3. Publisher specific control over pricing; and
4. A return-on-investment commensurate with the market demand for their information base property.

In accordance with one important feature of the present invention, a storage medium stores the database in encrypted form, and also stores index information which correlates portions of the encrypted database with index keys. The index information may itself be encrypted if desired. A host digital signal processor operatively connected to the storage medium is preprogramed so as to generate a database access request, read the index information from the storage medium, identify (in accordance with the index information) the portions of the encrypted database which satisfy the access request, and read the identified encrypted database portions from the storage medium.

A secure decoder control logic device coupled to the host processor receives the encrypted database portions read by the host processor, decrypts portions of the encrypted database read by the host processor to produce corresponding decrypted information, and transmits the decrypted information back to the host processor. The decoder control logic device also measures the quantity of usage of and/or other parameters pertaining to the information decrypted by the decrypting device, and stores these measurements in a non-volatile (and in many cases tamperproof) memory device. The invention thus provides a detailed record of database usage—including a breakdown of usage of each file or "property" stored on a local storage medium. Additional decryption of database information can be prevented or disabled if more than a certain percentage of a database (or more than a specified contiguous portion of a database) has been copied by the user as an additional safeguard preventing unauthorized copying.

The system may further include means for preventing tampering with the memory device and/or the decoder control logic means.

In accordance with another important feature of the present invention, database usage information is stored at a user's site and is periodically communicated to a central billing facility. For example, the non-volatile memory device storing data indicating database usage may be housed in a replaceable module. Periodically, the user disconnects the module from his computer system and sends it to a centralized billing facility. At the centralized billing facility, the contents of the memory device are read and used to bill the user according to his database usage.

In accordance with yet another important aspect of the present invention, communications is periodically established between the user's site and a central facility for the purpose of telecommunicating database usage information stored at the user's site to the central facility.

In accordance with yet another important feature of the invention, the user is automatically prevented from decrypting the encrypted database after a predetermined event occurs (e.g., "expiration" of a memory module, or excessive database usage indicating copying attempts) unless the user has implemented an "antidote" (e.g., input secret information into his computer system and/or install a replacement component).

Because the database is stored in encrypted form (and/or the database directory is encrypted or otherwise coded), the only way to obtain useful database information is to decrypt portions of it using the tamperproof decrypting means of the invention. Safeguards may thus be used to prevent unauthorized database decryption.

Thus, the present invention resolves several fundamental problems that would otherwise impede the rate of growth of the CD-ROM and CDI electronic publishing markets. For example, it is a costly process to create the core properties that may be incorporated into an information data and the structuring of the data base itself may, in some circumstances, be a costly effort. One way for data base preparers to recover the costs of constructing and maintaining a database is to charge a flat subscription or access fee to each user subscribing to use the database. If this is the only billing method used, however, infrequent users of the database may be discouraged from subscribing—because they would be asked to pay the same cost a frequent user pays. Furthermore, potential users may be hesitant to pay a significant one time or initial fee to acquire a technology or product with which they are unfamiliar.

With the present invention, a user will be able to pay (if so structured by the data base provider) according to his usage of the product and both the perceived risk, as well as—in lower usage environments—the high cost of the use of the technology, can be reduced or eliminated. Furthermore, since the present invention should accelerate the installed base and revenue growth rate for a given product, it may enable costs for even the high volume users to drop as well.

Moreover, database use can be measured simply by measuring the quantity of information which is decrypted. Other parameters relating to database usage (e.g., which databases and/or database subdivisions have been used; and the time, date and duration of use of each database and/or subdivision) may also be monitored and stored. The stored usage information can be periodically communicated to a centralized facility for billing the user in accordance with his databases usage. Moreover, the user's on-site database access system can be designed to cease functioning unless the user installs a new component and/or inputs "secret" information—and the centralized facility can provide the user with such replacement components and/or secret information only when the user has paid his bill.

Because the invention provides a detailed record of which literary properties have been used and how much each property has been used, use payments paid by the user may be fairly apportioned to the property owners according to actual use of their respective properties. For example, if a user licenses a storage medium storing a library containing hundreds of different literary properties and then uses only two properties in the library, the owners of those two properties can be paid substantially all of the licensing fees charged to the user.

A free market system is thus maintained in an environment not otherwise susceptible to free market competition. Publishers and authors can be assured that they will receive incomes based on customer demand for their properties, and publishers can retain absolute control over pricing—despite the fact that the properties are being distributed on a storage medium along with hundreds of other properties. "Best sellers" can still be distinguished from unpopular works, and authors can be paid royalties based on Consumer demand for their works.

This invention thus solves the fundamental CD and Optical publishing problem of how to provide end-users with disk libraries containing many different publications from different venders. Different properties from different publishers have differing significances in the today's marketplace. These products have prices which each reflect vendor investment, product specific market demand, and other vendor product marketing considerations. The present invention allows each vendor to set a price for their product(s) carried on CD or other media publications. The invention has an interlock system that prevents access to the non-volatile storage media (such as a CD-ROM disk) unless the user has contracted for the use of the disk and has a hardware plug-in module incorporating software.

When a customer makes use of stored data, the invention monitors which files are accessed and how much information is requested by the user to be displayed. In one embodiment of the present invention, information that is being reviewed or browsed may be distinguished from information that is read into a host computer for the purpose of copying, modifying, or telecommunicating, with different cost rates being applied to the different activities (so that, for example, the cost of browsing can be much less than the cost of copying or printing). Depending on the specific application and the nature of the user contract, the user might be required to:

1. Telephone the publisher once every three months, establishing a modem link over which a request is transmitted to telecommunicate back to the publisher the meter usage data; or 2. Mail to the publisher once every three months a removable EPROM module that contains the metered usage data.

The present invention thus prevents copying or browsing of a protected information base without adequate compensation to the publisher and its information base property (data) suppliers. Each supplier of information to an information base product receives a return on investment that reflects both the market demand for his specific property and the pricing and other marketing strategies that the supplier deems appropriate for his product.

The present invention allows very large numbers of customers to acquire library disks at very low initial costs, since the customer's billing can be largely based on usage, not simply possession of the library disk. As a result, potential customers, regardless of size or financing, will be able to maintain very broad based libraries on-site. If a given group regularly uses only a fraction of the information base, the group's users can still search the entire data base whenever appropriate. This means that most user billing is concentrated on those reference resources that the users frequently use, but an entire, comprehensive reference library extending beyond the user's frequent requirements is immediately available for use. A publisher will be in a much better position to provide large scale reference information base libraries. In many applications, the breadth and comprehensiveness of these encyclopedic libraries will encourage much more frequent use and a much larger body of users.

The present invention thus answers both the needs of a potentially very large customer base for low cost initial access to comprehensive digital disk based reference libraries, while at the same time maintaining supplier publisher control over pricing and guaranteeing an appropriate return on investment based on the customers demand for their products.

The invention may be particularly attractive to the owners of the leading properties in a given vertical publishing market, since these owners are likely to be particularly sensitive to the issues of unauthorized access to and copying of their product, pricing of their product, and equitable return on the value of the contribution of their product to an information base library. These publishers are likely to greatly increase their revenues through participation in library publication and distribution in accordance with the present invention—and the presence of such publishers in the marketplace will make it economically necessary (and feasible) for other publishers who have second tier properties to contribute to the same information base product.

The present invention may also include an optional security system which allows an organization to prevent usage of all or a portion of an information base unless the user enters his security code. Multiple levels of security codes can be supported to allow restriction of an individual's access according to his security authorization level.

There is significant value in using the present invention with certain types of non full-text information bases. For example, an electronic, CD disk containing comprehensive telephone white pages, telephone yellow pages, and as additional options, individual specific additional information (including estimated income level, publications received, job type and position, social security number, and other information that is compatible and legally available from one or more of the various mailing list companies) might be used with the present invention.

As a result of the present invention, the telephone operating companies providing directory listings can be compensated on the usage of their data base, while the mail order companies can also receive a revenue stream based on both usefulness of their data bases usefulness to customers and the extent of customer usage of their information. The present invention provides, for the first time, a context in which firms such as telephone operating companies and other information property suppliers can safely and profitably supply information for desk-top electronic information base products.

BRIEF DESCRIPTION OF THE DRAWINGS

These and other features and advantages of the present invention will be better and more completely understood by referring to the following detailed description of preferred embodiments in conjunction with the appended sheets of drawings, of which:

FIGS. 4a–4b are together a flow chart of the steps performed by the system shown in FIG. 1.

DETAILED DESCRIPTION OF PREFERRED EMBODIMENTS

Figure 1:
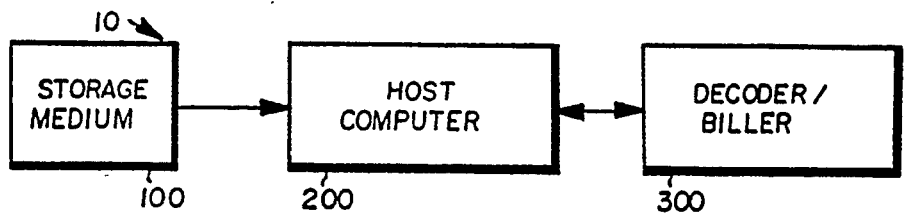
FIG. 1 is a schematic block diagram of a presently preferred exemplary embodiment of a database usage metering and protection system in accordance with the present invention.

FIG. 1 is a schematic block diagram of a presently preferred exemplary embodiment of a database usage metering and protection system 10 in accordance with the present invention. System 10 includes three main blocks: a storage medium block 100, a host computer 200, and a decoder/billet block 300.

Predefined database(s) is (are) stored on storage medium 100 in encrypted form, and selective portions of the database(s) are read from the storage medium by host computer 200 (several different databases can be stored on the same medium, although the present invention in its simplest form uses only a single stored database which may contain multiple files, segments, "properties" or the like). Host computer 200 may be a computer dedicated to the task of accessing the stored databases, but need not be (for example, the host computer can be a general-purpose digital computer used to do a variety of different tasks).

Figure 6:
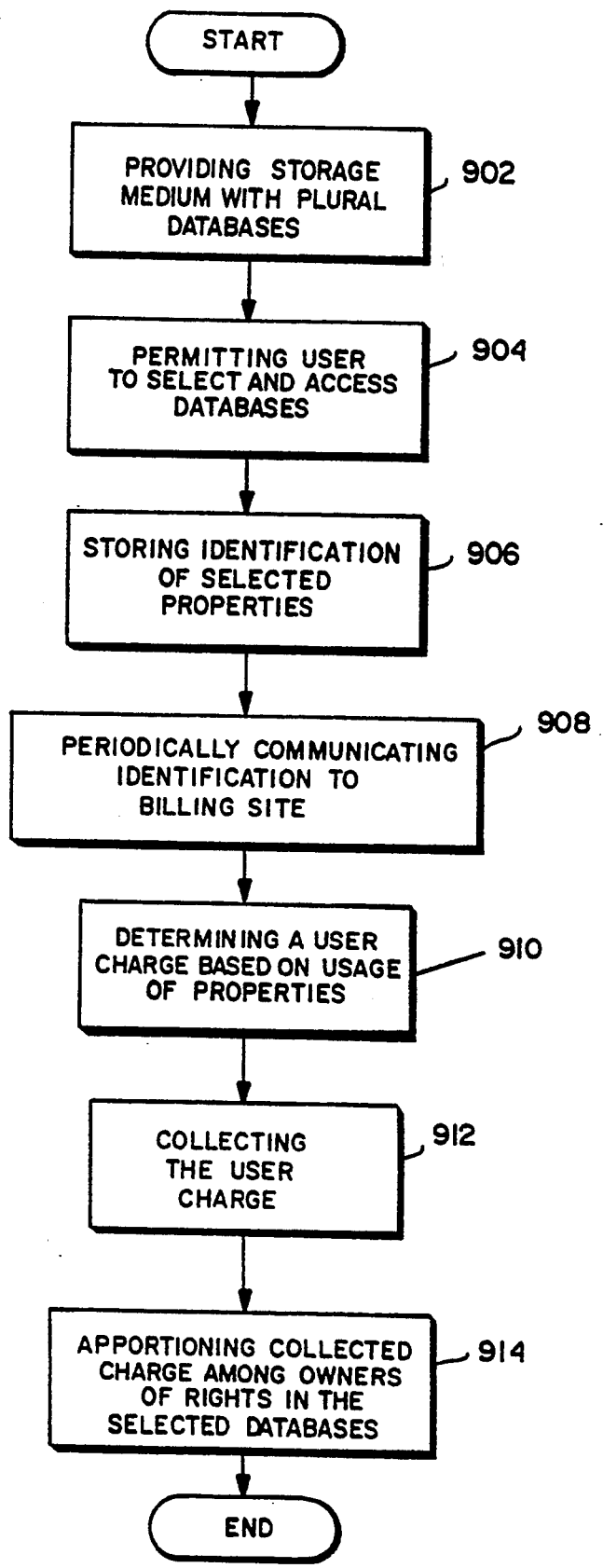
FIG. 6 is a flowchart of an overall method for receiving a return on investment from databases at user sites.

Decoder/biller block 300 is connected to host computer 200, and performs at least two important functions. Decoder/billet 300 decrypts portions of the stored databases on a user-need basis (e.g., after confirming the user has proper authority to access the databases (see FIG. 6, block 904)). Decoder/biller 300 also meters database usage, and generates usage information in a form which can periodically be conveyed to the owner of the databases (or his agent, e.g., a service company (see FIG. 6, blocks 906-908)). The usage information is typically used to calculate a database access fee the user is to be charged (see FIG. 6, blocks 910-914).

Decoder/biller block 300 may take the form of a hardware unit (or card) electrically connected to and located in proximity to (or within) host computer 200, or computer software executing on the host computer. Alternatively, decoder/billing block 300 might be located remotely to host computer 200 and communicate with the host computer via a data communications network or a telephone line.

Storage medium 100 is preferably some form of inexpensive mass digital information store (e.g., an optical disk, a bubble memory or a large hard disk or other fast transfer rate magnetic storage technology) prepared by the database owner and licensed to the user for use. CD-ROM, CDI, WORM, and other related optical/digital very large capacity storage modalities are now coming to the personal computer market and can be used for this purpose. These products are highly reliable, and very economically store hundred of megabytes up to multiple gigabytes of data.

For example, a CD-ROM diskette stores 550 megabytes of information on a single 12 centimeter laser diskette. CD-ROM technology now being released to the market will economically support up to eight parallel drives (4 gigabytes or 1,800,000 printed pages) and will access any desired sector in one second. In the next several years, technological advances should reduce access time to ¼ second, and storage capacity will be doubled (450,000 pages per diskette and 3,600,000 pages on-line) if CD-ROM manufacturers decide to market double-sided disks and drives. CD-ROM, CDI, and WORM products will be increasingly affordable over the next 30 months, with CD-ROM prices estimated to drop from $800.00 to $400.00 or less per drive, including controller, and OEM and volume prices estimated to drop to as low as $175.00 per unit by 1990. With CD-ROM, WORM, and other optical/digital technologies, users can both purchase large scale information bases and also themselves easily build organization-specific information bases.

The database is preferably "preprocessed" and then stored onto medium 100. The type of preprocessing performed depends upon the database and the application, but typically includes creating an encrypted rendition of the database and loading the encrypted rendition onto medium 100. One or more of the many sophisticated conventional data encryption schemes which presently exist can be used for encrypting the database. Preprocessing preferably also includes generating an index to the database and storing the index together with the encrypted version of the database on the storage medium 100. The index may or may not be encrypted.

The preprocessed database may be loaded onto storage medium 100 in a conventional fashion. For example, a "master" medium may be prepared, and then simply duplicated to yield a number of duplicate storage media 100. Storage of the entire preprocessed database (or databases) may require several storage medium units (i.e., several optical disks), each unit storing a part of the database. The database can index one or more databases each containing one or more files, documents or "properties" (the term "properties" referring to a literary or other textual work protected by copyright).

Figure 2:
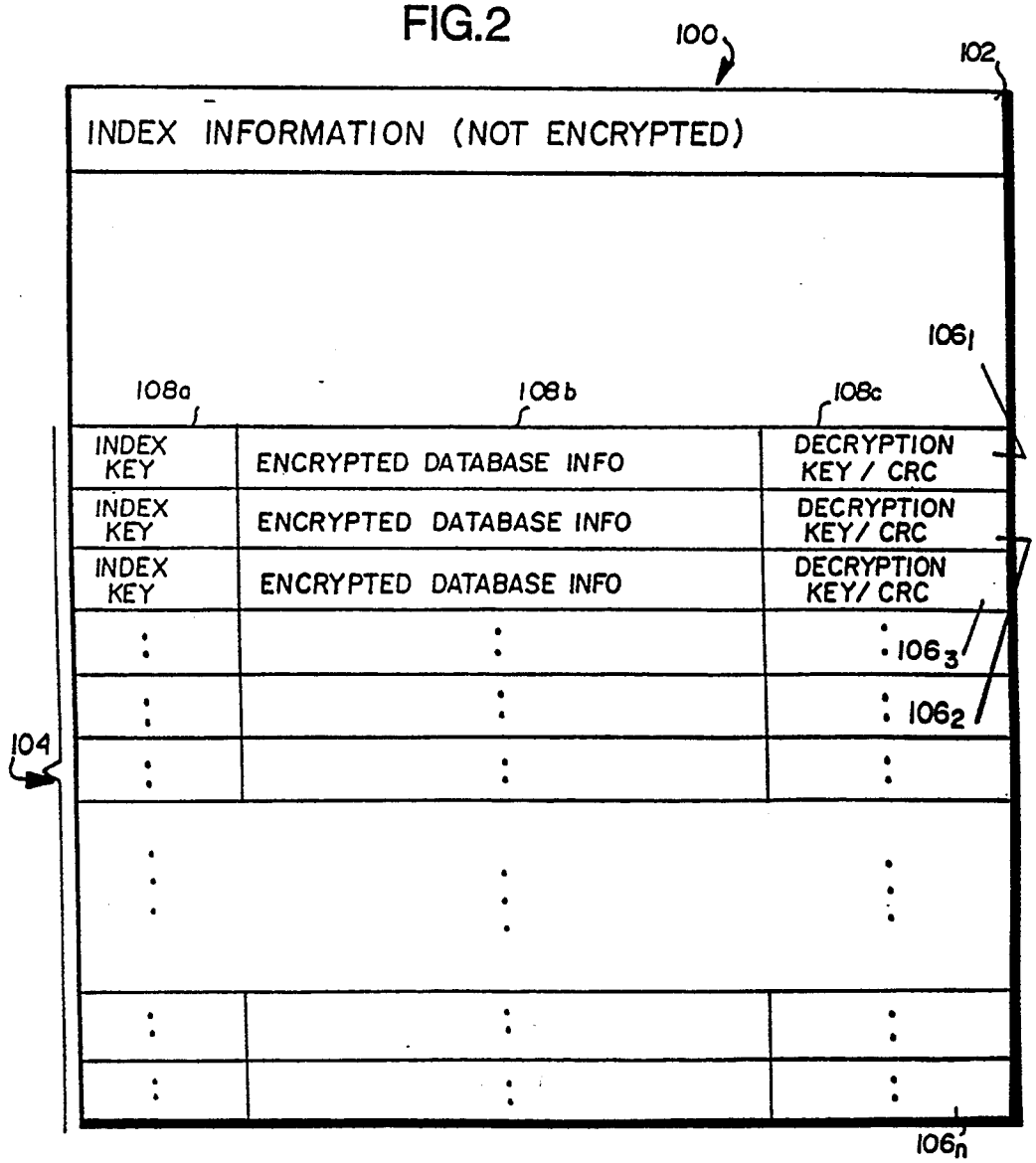
FIG. 2 is a schematic block diagram of the information stored in the storage medium block shown in FIG. 1.

FIG. 2 shows one exemplary scheme for storing database information on medium 100. The information stored on medium 100 includes an index portion 102 and an encrypted database portion 104. Database portion 104 includes a plurality of predefined quantities, or "blocks", 106 of digital data. Each block 106 includes three information "fields": an index key field 108a; an encrypted database information field 108b; and a decryption key/error-checking field 108c.

Index portion 102, which may be encrypted, provides information used to translate a database access request into the addresses of one or more blocks 106. The contents of index portion 102 depends on the type of database stored on medium 100 and the type of operations which are to be performed on the database. For example, if word or string searching is to be provided, index portion 102 may include a list of all of the words contained in the database and the blocks 106 in which the listed words appear. Index portion 102 may alternately (or also) include a "table of contents" of the database and a designation of the blocks 106 covering each entry in the table. Other ways to index a database are known, and the present invention is not limited to any particular indexing scheme.

Index key 108a of each block 106 stores data which can be referenced in accordance with information stored in index information portion 102. Index key 108a may be explicit (e.g., a digital data word representing an indexing code or address) or implicit (e.g., physical "addresses" of storage medium 100 may themselves be used as indexing keys).

Encrypted database information fields 108b contains predetermined portions of the encrypted database. The size of these portions may be determined by the particular hardware and/or encryption techniques used, and is preferably (but need not be) fixed. If the nature of the database permits, logically-related information should be stored in the same blocks 106 (i.e., the database should be presorted and hierarchically organized) to reduce the number of accesses of storage medium 100 required to respond to a single user request. Techniques for-organizing databases are known to those skilled in the art of information retrieval and database design and management.

Decryption key/error-checking field 108c performs two functions in the preferred embodiment. First, it provides conventional error checking (e.g. CRC or parity) information useful for detecting information reading errors. Secondly, the field may provide information needed by sophisticated data decryption schemes to decrypt the information stored in associated field 108b. In many data decryption schemes, a decryption key word (which may itself be encrypted) carried with the encrypted data is used in conjunction with an additional data decryption key generated by the data decrypting device to decrypt the data. Field 108c may or may not be required depending upon the error checking and decryption schemes employed.

Host computer 200 contains resident software and hardware which provides an interface for all database transactions. Computer 200 includes one or more appropriate I/O handlers and associated hardware device drivers which permit the computer to read information from storage medium 100. Host computer 200 also includes appropriate data communications software and associated hardware which permits it to exchange data with decoder/biller block 300. The data communications pathway between host computer 200 and decoder/biller block 300 may be a shared data bus, a dedicated I/O channel, a shared data communications network, or the like.

When a user requests information from the database stored on storage medium 100, the computer program resident on computer 200 controls hardware of the computer to read the index information 102 stored on medium 100 in order to ascertain which database blocks 106 contain information specified by the user request. The computer program then controls host computer 200 to load one or more blocks 106 of the stored database information into the host computer memory. The host computer 200 then, under software control, strips off the contents of encrypted fields 108b from the blocks of information now resident in its memory (along with some or all of the contents of decryption key/CRC field 108c) and sends some or all of this information to the decoder/billet block 300 for processing.

Because the index portion 102 is not encrypted, host computer 200 can manipulate the index information without involving decoder/biller block 300. Although this is an important advantage in some applications (since the user is permitted to "browse" through the index "for free"), other applications may demand a level of security which is compromised by providing an unencrypted index. For example, unencrypted, very complete indexes might be used to reconstruct significant portions of the database itself. It may therefore be desirable to encrypt index portion 102 as well as database portion 104 to provide higher security.

If index portion 102 is encrypted, it must be decrypted before a user can make selections from it or otherwise use it to locate blocks 106. Decryption of index portion 102 should be performed in a secure environment (such as in decoder/biller block 300, or in a dedicated "browsing workstation" to be discussed in connection with FIG. 5). Alternatively, decoder/biller block 300 may temporarily provide host computer 200 with the decryption key information needed to decrypt index portion 102 (the index portion may be encrypted using an encryption technique which is different from the one used to encrypt database portion 104), and the host computer can decrypt sections of the index portion as needed by the user.

In one possible permutation of the invention, neither the database nor the index stored on medium 100 is "encrypted" using a formal encryption algorithm, but instead, the manner in which the database and/or the index is stored on the storage medium is itself used to make information incoherent unless it is read from the medium using a predefined access algorithm.

For example, records of the database may be non-contiguously stored on medium in a pseudo-random order, so that sequential reading of records produces only incoherent information. An index stored on medium 100 contains the information needed to locate logically sequential database records. This index ("directory map") may also be in some way "scrambled" (for example, encrypted using formal encryption techniques, perhaps simply incomplete so that it must be supplemented with information and/or algorithms contained in decoder/biller block 300, or another scheme can be used to properly interpret the directory map, directory map interpretation being necessary to determine the locations on medium 100 of the components of a given database or other "property"). Different index scrambling schemes can be used for different copies of storage media 100 to prevent development of a "universal" de-scrambling device or algorithm.

Decoder/biller block 300 measures the amount and/or type of information sent to it for decryption and stores information indicating database usage over time from such measured amounts. Decoder/billet block 300 stores all necessary billing and usage information in a protected, non-volatile memory device (or in a protected, non-volatile storage facility within the host computer 200) for later retrieval and use in calculating database usage fees.

Because the database information read from medium 100 is useless unless it is first decrypted, and decoder/billet block 300 is the only portion of system 10 which is capable of decrypting the encrypted database information, the decoder/biller block can accurately meter the amount and nature of data accessed from the stored database {e.g., by counting the number of blocks 106 which are encrypted, determining the group of logically related information ("property") stored on medium 100 which is logically associated with the data being decrypted, and/or determining other convenient parameters indicating the quantity and/or identity of data which is decrypted}. Decoder/biller block 300 decrypts the information sent to it, and returns the decrypted information to host computer 200 for display, storage, printing, telecommunications, or the like (or otherwise makes the decrypted information available to the user).

Figure 3:
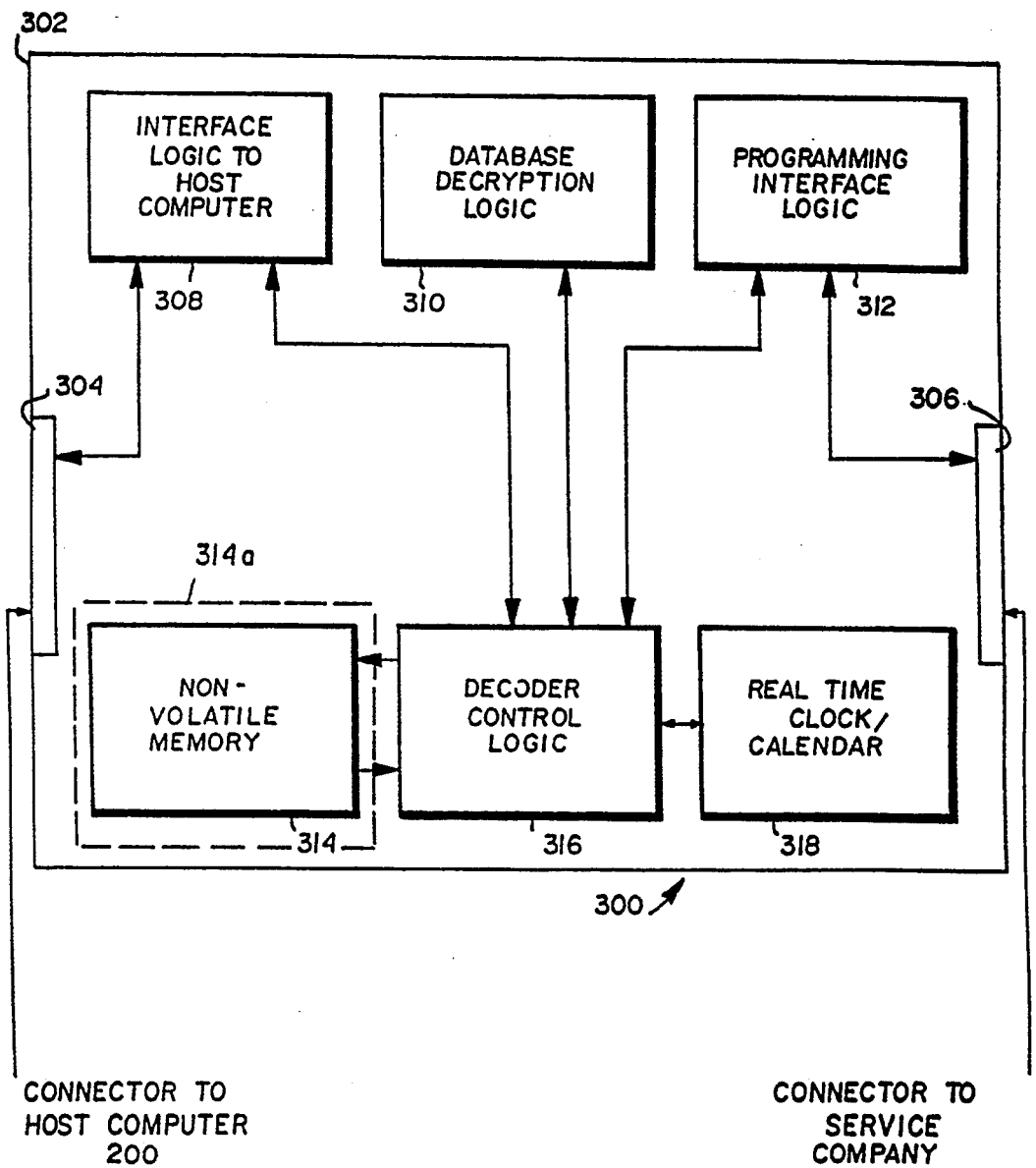
FIG. 3 is a more detailed schematic block diagram of the decoder/billet block shown in FIG. 1.

FIG. 3 is a more detailed schematic diagram of the decoder/biller block 300 shown in FIG. 1. Block 300 includes the following: a tamper-proof mechanism 302; a data connector 304 for connection to the host computer 200; a data connector 306 for connection to an off-site service company; host computer interface logic 308; database decryption logic 310; interface logic 312;

a non-volatile memory 314; decoder control logic 316; and a real-time clock/calendar 318.

Tamper-proof mechanism 302 prevents unauthorized persons from electronically or mechanically tampering with decoder/biller block 300, and preferably includes both mechanical and electronic safeguards. For example, the physical enclosure which encapsulates the components of block 300 should prevent unauthorized individuals from accessing the enclosed components. The components can be epoxied or potted if desired, and/or the enclosure can be provided with a mechanical seal which clearly evidences any tampering.

Another safeguard against tampering can be provided by implementing one of more of functional blocks 308-318 in the form of a custom integrated circuit. Such custom integrated circuits are not easily reproducible by an unauthorized person, nor could functional equivalents be designed ("black-boxed") so long as the techniques used to encrypt and decrypt the database are sophisticated. This level of data encryption sophistication is well within present technology.

Connector 304 and interface logic 308 communicate data between decoder/biller block 300 and host computer 200. Interface logic 308 includes conventional electronics which interface host computer 200 with decoder control logic 316. Interface logic 308 is electronically connected to physical electronic connector 304, which in turn is connected to a mating connector of host computer 200.

The exact configuration of interface logic 308 and connector 304 depends upon the nature of host computer 200 and sort of data communications pathway desired. For example, in one exemplary arrangement, connector 304 comprises a host computer bus connector (connected to the main bus of host computer 200 and addressed directly by the host computer processor) and interface logic 308 comprises a bus interface. Of course, connector 304 could comprise a standard RS-232 port connector and interface logic 308 could comprise conventional port interface logic—or the interface logic could comprise a communications controller (e.g., a data communications network controller or a modem) and the connector 304 could be a standard communications connector (if decoder/biller block 300 were located remotely from host computer 200).

Other communications connectors and/or ports might be used for connector 304, the specific arrangement used being chosen based on the application, convenient performance and/or cost. Other possible arrangements, including placing the decoder/billet block 300 into the same housing containing the drive which accesses medium 100, or connected to (or actually connected as part of) cabling connecting the drive for medium 100 to host computer 200, can be used.

Decoder control logic 316 preferably includes a conventional microprocessor pre-programmed with a predetermined control computer program, but might be implemented in other ways (e.g., as a discrete digital logic sequential state machine). Decoder control logic 316 controls all of the functions of decoder/biller block 300 in the preferred embodiment. Decoder control logic 316 also monitors database usage, produces digital data indicating the amount of such usage, and stores this data in non-volatile memory 314 for later retrieval (e.g., by a service company or the database owner).

Real time clock/calendar 318 permits database usage metering to indicate the time and date of each usage and the duration of usage, thus providing an important audit tool for both customers and the service company. In addition, this real-time clock/calendar 318 can be pre-programmed to allow the user to access certain databases only at pre-programmed times (e.g., by limiting access for given user security access codes).

Interface logic 312 and connector 306 may be used to communicate data with an off-site facility, such as the centralized computer of the database owner or a service company which handles periodic database usage billing. In one exemplary embodiment, connector 306 includes a standard telephone connector and interface logic 312 includes a standard modem. If desired, connectors 304 and 306 may comprise the same connector, and interface logic 308 and interface logic 312 may comprise the same components.

Database decryption logic 310 takes input digital data signals provided to it by decoder control logic 316 (these signals representing encrypted digital data read by host computer 200 from storage medium 100 and passed to the decoder control logic via connector 304 and interface logic 308), decrypts these digital data signals using a predefined decryption algorithm, and outputs decrypted data signals to the decoder control logic for display, printing, and the like. One or several different predefined decryption algorithms can be stored in (or hardwired within) decryption logic 310, and additional decryption algorithms can be downloaded into the decoder/biller block 300 as needed or required via interface logic 312.

Many conventional methods of encrypting/decrypting data are known, spanning from simple lookup tables to complex mathematical algorithms. The method of data encryption/decryption used depends on the amount of extra computer processing overhead and data storage space that the application will allow. It is not uncommon for substantial overhead to be needed to handle encrypted data.

Figure 4B:
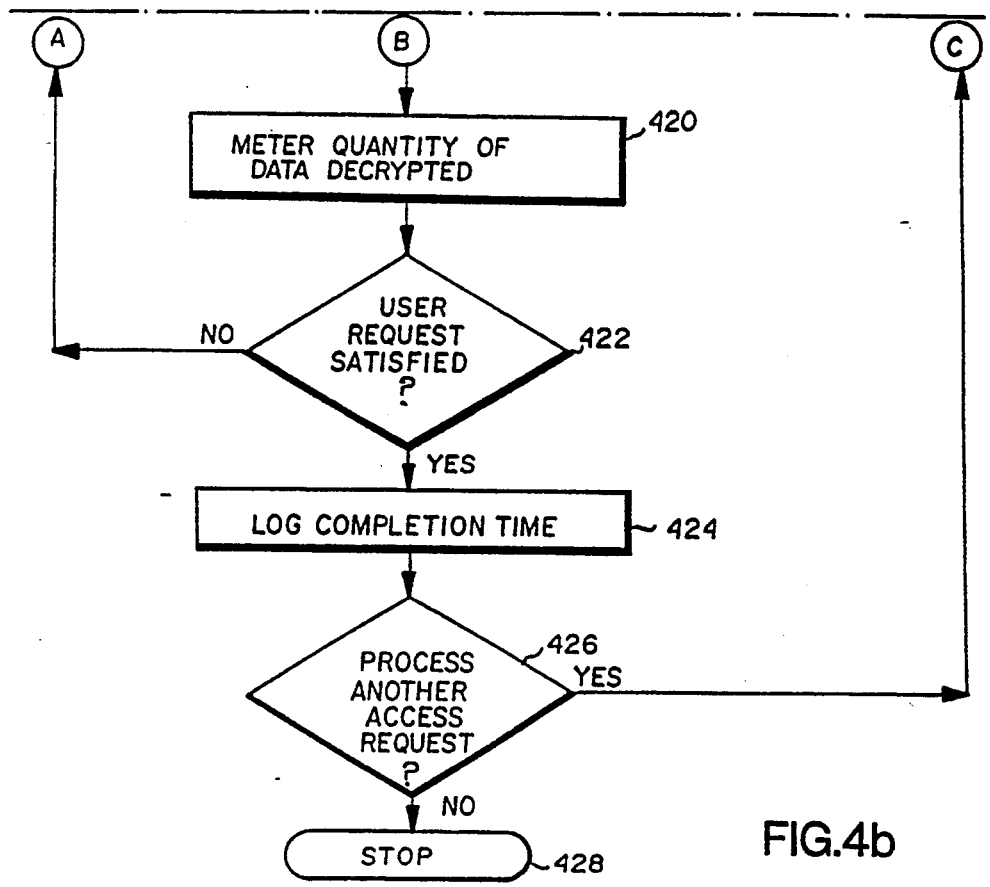

To install system 10, storage medium 100 (along with its associated drive/access device) is connected to host computer 200, and decoder/biller 300 is also connected to the host computer port and/or bus (by connecting connector 304 as described). A non-volatile memory 314 is provided which has been preloaded with the following information (or is loaded upon installation):

(a) database key(s) and/or user password(s);
(b) billing rates (optional—may be performed by the database owner at his own facility);
(c) expiration date and "antidote" information; and
(d) user identification(s)/security levels (if desired), FIGS. 4(A)-4(B) are together a high-level flowchart of the routine 400 performed by system 10 to access a portion of the stored database.

To access database information, the user causes host computer 200 to execute software resident within it which permits the user to formulate a database access request (block 402). As discussed above, the nature of the access request depends on the nature of the database and the needs of the user. Most users require the ability to perform lexical database searches (i.e., searches for words, strings, and the like). However, other methods of accessing information are also possible. For example, if the database is a literary novel, the user's access request might be a chapter number and/or page number. Personal Library Software, Inc.. of Bethesda, Md., offers advanced indexing software technology which allows a user to perform both keyword and topical searches (contrasting with other commercial products, which are limited to keyword searching techniques).

Personal Library software can be used to great advantage with the present invention.

The user then inputs an access request (block 404) using a keyboard or other standard I/O device connected to host computer 200. In response to the user's access request, host computer 200 accesses index portion 102 stored on medium 100 and obtains from the index portion the addresses of (or index keys corresponding to) each block 106 of the encrypted database which satisfies the user's access request (block 406) (index portion decryption is performed at this time if necessary). Host computer 200 then reads the appropriate block(s) 106 of the encrypted database from storage medium 100 and stores these blocks of information into its own internal random access memory (block 408).

System 10 may require the user to input identification and/or password information along with his access request (block 404). System 10 checks the authority of the user to access the database by transmitting the inputted ID/password information to decoder/billet block 300 for comparison with a list of authorized IDs/passwords stored in memory 314 (block 410). If decoder/biller block decoder control logic 316 denies authorization to continue with database access (because the inputted user information is incorrect, because the access request cannot be performed at the current time/date, etc.) (block 412), the decoder/biller block refuses to decrypt any data sent to it (block 414)—and may cease communicating with the host computer 200, and/or simply ignore any encrypted information the host computer sends it. ,While encrypted database information is already present in the memory of host computer 200, this encrypted information is incoherent and cannot be used for any useful purpose.

On the other hand, if decoder control logic 316 of decoder/biller 300 grants authority to proceed (block 412), the decoder control logic begins a "billing cycle", and stores information logging the billing cycle into non-volatile memory 314 (block 416). The information stored in memory 314 may include: (a) the name of the database file being accessed; (b) the section of the database being accessed (name, "property designation", file name, or other identification information); (c) the identification of the user accessing the database; and (d) the date and time the database access begins.

The information stored in non-volatile memory 314 may thus be used to create an "audit trail" which tracks different users (or groups of users) and their database usages. Special use passwords may be required to access selected databases, and actual use of all databases may be verified later from the information stored in memory 314. Such stored information is extremely valuable not only to help detect unmonitored database use, but also to allow detailed bills to be generated and to help determine which users among multiple users are responsible for generating usage charges. Such a detailed audit trail can be used to allow publishers and users to determine the detailed activities of users. This information can be used by users to determine what they are being charged for. The audit trail information can also be used by publishers and property owners to conduct marketing surveys—providing more detailed information about user demographics and information use than is presently available.

In addition, it may be desirable to code storage medium 100 (or particular databases or files stored on the medium) with unique (e.g., randomly-generated) user passwords by embedding secret password information in the database information. Non-volatile memory 314 can store information which matches the code associated with the particular copy of the storage medium licensed to a particular user. This coded information can be encrypted, and coding schemes and/or coded information may be changed periodically. Different users can be assigned different codes to prevent users from exchanging or sharing storage media 100.

This additional security feature also impedes the use of unauthorized decoder units (e.g., clandestine units manufactured to be similar to block 300). Such unauthorized units would not be equipped with the correct coded information, and even if they were, would work for only one similarly coded storage medium (or for only one or a few databases stored on a particular storage medium). The coding of storage medium 100 with embedded, user-identifying codes would also help to identify how any unauthorized copies of the database information came into being, since the coded information would be embedded in the database information itself and would thus also be present in any copies made from an original. Users found in this manner to be involved in copyright infringement could be penalized appropriately under the civil and criminal penalties of the copyright law, as well as for breach of their contractual obligations.

Decoder control logic 316 also is enabled at this time to begin (a) decrypting information sent to it by host computer 200 and (b) sending the decrypted information back to the host computer (block 418). Decoder control logic 316 meters the quantity and/or other usage parameters of data which is decrypted, and stores this usage information into non-volatile memory 314 along with the other billing information (block 420) (the decoder control logic may store quantity information directly into the memory, or may first convert it to billing information taking into account, for example, the cost of using the database file being accessed). This process continues until the user's request has been satisfied (as tested for by block 422).

The user can be billed an annual fee for unlimited use of some databases or database properties, and billed only for actual use of other databases or database properties. In this way, the user can pay a flat fee for the databases, or specific database properties or "books", he uses most often, and yet have access on a "pay-as-you-go" basis to other databases which he might use occasionally but not enough to justify paying the cost for unlimited use. This billing method provides the user with database resources he might not otherwise be able to afford, and also stimulates use of databases which are not used often but are nevertheless extremely valuable at times.

The specific steps performed to decrypt data (block 418) depends on the particular data encryption/decryption scheme used. Host computer 200 transmits encrypted data in predetermined quantities (e.g., fixed-length blocks) to interface logic 308 via connector 304 in the preferred embodiment. Interface logic 308 communicates this encrypted data to decoder control logic 316, which communicates it-to data encryption/decryption logic 310. Logic 310 translates the encrypted data into intelligible information using a predetermined conventional decryption algorithm, and communicates the decrypted data back to decoder control logic 316. Decoder control logic 316 then communicates the decrypted data to host computer 200 via interface logic 308 and connector 304.

The database access program resident in the host computer then controls the host computer to display and/or print the decrypted information. If desired, the program resident in the host computer 200 can prevent the user from doing anything other than displaying (and/or printing) the decrypted data. Alternatively, this program may permit the user to manipulate the decrypted text (e.g., store the data in a disk file or in the memory of the host computer) to permit the user to browse through full-text data at his leisure and/or to use this data for word processing, telecommunicating, or the like.

Decoder control logic 316 meters database usage (block 420) by, for example, measuring the amount of information which is decrypted (e.g., by counting the number of fixed-length blocks which are decrypted; determining the source documents the decrypted information is associated with; and measuring the time, date and/or duration of access of the decrypted information). Control logic 316 may also record other billing information, such as the length of the database file being opened. Control logic 316 may be arranged to recognize the names or other designations of subsections of the database being accessed, allowing for different billing rates depending on the type or supplier of the information (so that use of more expensive databases can be billed at higher rates).

It may be desirable to not bill users for simply searching through the database (or at least, not bill at the full rate), but to bill only or at a higher rate for data that is decrypted and displayed, printed or communicated. It is for this reason that the database index is not itself encrypted in one embodiment—so that the user can browse through the index "for free" (or at a lower charge). As mentioned previously, however, it may be desirable in some instances to provide additional security by encrypting the index as well as the database. If decoder/billet block 300 decrypts the index, it can meter index usage and store this usage information into non-volatile memory 314—thus permitting the user to be billed for index browsing at comparatively low rates. A dedicated "browsing terminal" (to be discussed shortly) may be used in some applications to provide a secure environment in which browsing can occur and billed at a rate which may differ from that for database information usage (e.g., printing, telecommunicating, copying, etc).

After the user's access request has been satisfied (as tested for by block 422), the decoder control logic stores, into non-volatile memory 314, the time the user finishes accessing the database. (block 424). The resident program then allows the user to input another access request (using the same or different database) (block 426). If the user does input another access request, the steps of blocks 404-426 are performed again- (with blocks 416, 420 and 424 causing an additional billing log entry to be stored in memory 314).

The information stored in memory 314.is periodically communicated to the service company and used to bill the user for database usage. In one exemplary embodiment, memory 314 is housed in a storage module 314a which is easily separable from system 10. Periodically, the user disconnects memory module 314 from decoder/billet block 300, mails the module to the service company, and installs an alternative replacement module (the "next" module) into system 10. Decoder control logic 316 disables data decryption unless a module 314a is connected to it (and perhaps also when the control logic has determined the non-volatile storage area is nearly full).

In another embodiment, communications between decoder/biller block 300 and the service company is periodically established for the purpose of downloading the contents of memory 314 to the service company billing computer. If connector 306 and programming interface logic 312 comprise a conventional standard telephone connector and associated modem, such communications can be established over standard telephone lines. The information stored in memory 314 is transmitted over the telephone line to the service company computer, and the service company computer then transmits commands which control decoder control logic 316 to reset the memory. In addition, the service company can establish communications with decoder/billet block 300 to monitor use of the databases stored on medium 100 (and detect misuse and unauthorized use). The service company may also control decoder/billet block 300 remotely (e.g., to disable it from operating if customer fails to pay his bill).

System 10 may include an enabling/disabling mechanism which prevents a user from accessing the stored database information if he fails to pay his bill. For example, in the embodiment discussed above having a separable memory module 314a, the service company can refuse to mail the user a replacement module until all outstanding balances are paid. If the customer fails to pay his bill, he will eventually fill up the memory module he has installed, causing decoder control logic 316 to disable data decryption (or alternatively, the modules 314a can be electronically data-coded, and the decoder control logic can refuse to permit decryption to be performed when the module date code is determined to be prior to the current date generated by real time clock/calendar 3 18 ).

Decoder control logic 316 can be disabled from operating if the real time clock ever ceases to operate (for example, the clock may be battery powered and the battery might go dead after a year or so if scheduled preventive maintenance is not performed). Once the real time clock is repaired, a communications link can be established between decoder/biller block 300 and the central facility. The central facility can then read the contents of non-volatile memory 314. If no suspicious or unauthorized activities have occurred, the central facility can reset real time clock 318 or check a locally set real time clock to permit normal database decoding operations to resume.

Another arrangement can control decoder control logic 316 to periodically, automatically change authorized passwords—and the service company can refuse to tell the customer the new passwords until the customer has paid his bill.

Alternatively or in addition to the arrangements discussed above, system 10 may be provided with an automatic "self-destruct" mechanism which automatically "destroys" a critical part of the system (e.g., the information stored on medium 100, or the password table stored in non-volatile memory 314) at a preset real time deadline (timed by real time clock/calendar 318) unless the customer implements an "antidote" (e.g., inputs a series of secret code words) prior to the deadline. The service company can provide antidote instructions only to customers who have paid their bills. This automatic "self-destruct" mechanism can also be activated whenever the customer exceeds a predetermined maximum (and/or minimum) usage limit (so as to prevent a customer from running up a huge bill, from attempting to decrypt and store substantial portions of the unencrypted database, or from continuing to use the database in the unlikely event that he has successfully prevented the-logging of usage information). If additional protection against database piracy is desired, the automatic "self-destruct" mechanism can also be activated whenever the user attempts to access, in one session or over a number of different sessions or within a given time frame, more than a certain percentage of a given database and/or more than a certain number of contiguous blocks of (or logically related records or other subdivisions of) the same database. A permanent record of the blocks (records or other subdivisions) which have been accessed may be retained in non-volatile memory 314 so that the user can be prevented from copying an excessive amount or selected database properties or segments over a period determined by the database owner.

It may also be desirable to enable the user to program parameters stored in non-volatile memory 314 which limits the user's own use of database information stored on medium 100. The routine shown in FIGS. 4(A)-4(B) can provide a user interface with decoder/billet block 300 which permits a user to optionally store, in a user-accessible file within memory 314, information representing ceilings on database usage or cost of usage over a period of time (e.g., a maximum monthly duration or cost for database usage, limitations on the type of information which can be decrypted, etc.). Decoder/biller block 300 keeps a running total of the parameter(s) the user has specified, and ceases decrypting database information if the total exceeds the user-specified parameter value. This feature permits the user to budget his database use, and is especially valuable in a business environment—since it permits an organization to directly limit the cost of database access by employees to an amount selected by the organization.

Although the embodiment shown in FIG. 1 is particularly suited for installation at a customer site, some applications might necessitate that decoder/biller block 300 and storage medium 100 be operated remotely to the customer site and communicate information to the customer via a communications link (e.g., a standard telephone line). In this "direct connect decryption" mode of operation, data decryption is performed at a central facility of the service company. Since only a small portion of the database is decrypted at any one time, a telephone line provides sufficient bandwidth to transmit the decrypted data at rates suitable for display by the customer's computer.

Using the "direct connect" mode, there is no need for periodic exchange of service storage modules or for pre-scheduled periodic communications with the local host computer. Billing data could be accrued in real time, and the service company could disconnect or change the service of a customer at any time. Database updating is also simplified, and current information or changing data is always at hand (since it can be automatically included in a user database search). Moreover, the user can use just about any kind of computer to access the service company central facility. Furthermore, the connect time charges for communication networks are becoming more competitive in price, making this "direct connect" mode attractive for some applications.

The chief disadvantages of this "direct connect" approach are: Database access speed i s much slower than in the locally-installed embodiment discussed above (because of the shared nature of the central facility and because of the relatively low data transmission rate-of standard telephone lines); communications costs are much greater; and the service company must purchase and operate an expensive multi-user computer facility.

The "direct connect-" and the locally stored database features might be used together in some applications. For example, the bulk of a database can be stored on and accessed locally from a local storage medium 100. Database update file information can be stored and updated at a remote centralized facility and accessed via a telecommunications link to provide extremely current information in addition to the "older" information provided on-site.

There are thus both advantages and disadvantages to the "direct connect" mode. This mode may be offered as an option for users who require up-to-the-minute updated databases.

Once data is decrypted and stored into the memory of host computer 200 (e.g., for searching or manipulation rather than simply for display), it is susceptible to being intercepted by a "pirate" intercept program. System 10 bills for the data which is decrypted (so that the user would run up a huge bill if he tried to copy a large portion of a database). Nevertheless, it may be desirable in some applications to restrict the manner in which a customer can use decrypted data, while .at the same time not restricting manipulations (e.g., browsing) of the decrypted data.

For example, keyword searching does not require a data image of the database (rather, it is most efficiently performed using index information 102). However, other search techniques (e.g., final "zooming in" of the information being searched for) may require manipulation of a data image. It may be desirable to absolutely prevent the user from copying the decrypted data image information.. However, the user should be able to manipulate data images in other ways (e.g., by browsing through full-text data and the like). It may be impossible to impose such restrictions on data stored in the user's own host computer 200 (or the user may be able to easily defeat such restrictions once imposed through skillful programming techniques).

Figure 5:
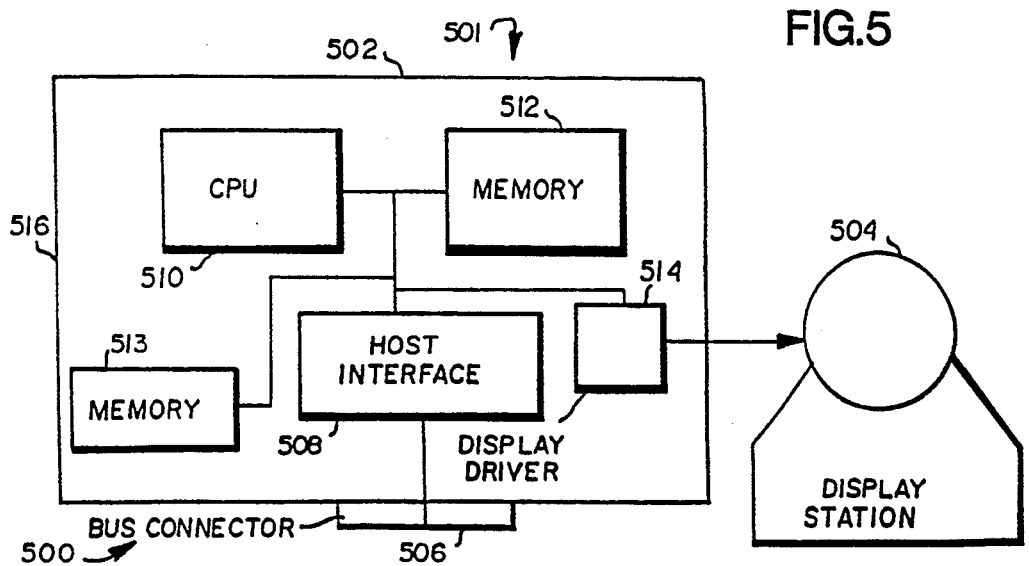
FIG. 5 is a schematic block diagram of a further presently preferred exemplary embodiment of a database usage metering and protection system in accordance with the present invention.

FIG. 5 is a block diagram of an alternate embodiment of a database usage metering and protection system 500 in accordance with the present invention. The FIG. 5 embodiment includes a dedicated independent hardware unit ("browsing workstation") 501, which can either act as a "stand-alone" or be designed to interface with additional data processing components.

Browsing workstation 501 in the preferred embodiment includes a proprietary, single-board computer 502 connected to a dedicated proprietary display station 504 having a secure environment. Computer 502 includes a bus connector 506, a host interface 508, a CPU 516, a volatile, protected memory 512, a non-volatile memory 513, and a display driver 514. Computer 502 is enclosed in a tamper-proof enclosure 516 to completely prevent access to its internal components except by authorized service personnel.

Computer 502 performs the decryption and billing functions discussed previously, and then stores the decrypted data into its own memory 512. This arrangement allows the user to review ("browse") the information (on dedicated display station 504) prior to sending desired information to his host computer (via interface 508 and connector 506) for printing or other use. Thus, the decrypted database data image is first stored and manipulated by computer 502. The user can be billed at one rate for browsing through or otherwise manipulating data in computer 502, and billed at a higher rate for transferring data to his host computer (from which the data can be printed, stored, outputted, or telecommunicated to other computers and users).

The user can evaluate the data while it is resident in computer memory 512 (via display station 504) in order to decide whether or not he really wants the information transferred to his own host computer. In this way, very different billing rates can be provided for (a) browsing large amounts of full-text information and (b) actual use of information in the host computer (e.g., for word processing, telecommunications, printing, etc.).

Browsing workstation 501 may share some of the hardware and/or software of a host computer in order to reduce hardware costs—so long as information security is not significantly compromised. For example, one of the workstations normally connected to the host computer and its associated driver might be used in lieu of dedicated display station 504 and display driver 514 if there is little or no possibility that the user could copy a significant part of a database by reading information produced by the host computer display driver while browsing is in progress.

In a further embodiment, sophisticated software (not susceptible to manipulation or other misuse) could be temporarily loaded into the host computer (e.g., from storage medium 100) and executed to provide the functionality of some or all of the hardware "blocks" shown in FIGS. 3 or 5. Such software might use the security system provided by the host computer (and/or sophisticated techniques which are difficult to discover and the host computer itself for decryption of database information and non-volatile storage of database usage information which may be adequately secure for various applications.

For example, although it may be undesirable to permit data type decryption key information to reside in the host computer permanently, the decryption key information can be temporarily provided by a protected memory device to the host computer. The host computer may then decrypt database information using the decryption key information, and destroy the key information after use. The host computer may decrypt database information "on the fly" and not retain much encrypted or decrypted information in memory at any one time to help prevent copying.

Although a dedicated hardware/software system typically provides the best assurance against tampering, techniques which may be implemented in software executing on a non-dedicated system may provide sufficient tamper resistance for some applications. For example, secure program control and usage information can be stored on a floppy disk which is accessed via the disk drive of a general-purpose non-dedicated personal computer. A non-volatile memory and logic device connected to the personal computer may (in conjunction with the secure program control software executing on the computer and/or a hardware controller connected to the computer) control and monitor the position of the read/write head of the disk drive, store the current head position in the non-volatile memory, and supervise execution of the secure program control software. Database usage information may be gathered by the program control software and stored on the floppy disk. Any attempts to tamper with the floppy disk which alters the last read/write head position may cause a warning message to be stored on the floppy disk in a database audit trail section of the disk (possibly along with cumulative messages indicating previous such occurrences) and may also result in destruction and/or disablement of the secure program control software.

While the present invention has been described with what is presently considered to be the most practical and preferred embodiments, it is to be understood that the appended claims are not to be limited to the disclosed embodiments, but on the contrary, are intended to cover modifications, variations, and/or equivalent arrangements which retain any of the novel features and advantages of this invention.

What is claimed is:

1. A method of providing, for use by a customer at said customer's site, a database that is at least in part encrypted, said method permitting said customer to use at least one part of said database while helping to ensure that owners of rights in portions of said database are properly compensated for use of said database, said method comprising the steps of:
   (i) providing at least one storage medium at said customer's site, said storage medium having at least a portion of said database stored thereon in encrypted form, said database including at least first and second parts, a first owner owning at least one right in said first part, a second owner owning at least one right in said second part;
   (ii) providing a database protection system for use with at least a portion of said database;
   (iii) supplying at least one key for use by said database protection system;
   (iv) limiting said customer's use of at least a portion of said database;
   (v) decrypting an encrypted portion of said database at least in part by using said database protection system and said key;
   (vi) receiving a payment associated at least in part with use of (a) said first part, and (b) said second part, of said database; and
   (vii) providing compensation to said first and second owners by apportioning at least part of said payment amongst said first and second owners.

2. A method as in claim 1 wherein customer use of at least a portion of said database includes accessing at least a portion of said database.

3. A method as in claim 1 wherein customer use of at least a portion of said database contents includes copying at least a portion of said database contents.

4. A method as in claim 1 wherein:
   said database contains plural properties;
   said method further includes metering at least one aspect of use of at least a portion of said database, and
   said providing step (vii) includes the step of apportioning said payment amongst said at least first and second owners according at least in part to said metering.

5. A method as in claim 4, wherein:
   said method further includes the step of enabling said customer to specify, at said customer's site, at least one budget establishing at least one maximum quantity limit for use of at least one portion of said database properties by at least one of said customer's employees; and said limiting step (iv) conditionally limits use of at least a portion of said database properties based at least in part on said maximum quantity limit.

6. A method as in claim 4 further including the step of making a copy of at least one portion of said database properties, said copying step including providing in said copy at least one embedded, copy origin identifying code.

7. A method as in claim 4 wherein said method further includes:
 (a) producing information in response to at least a portion of said metering; and
 (b) deriving marketing survey information from at least a portion of said produced information.

8. A method as in claim 4 further including:
 (a) producing information in response to at least a portion of said metering; and
 (b) using at least a portion of said produced information in connection with marketing.

9. A method as in claim 1 further including metering at least one aspect of use of said database contents.

10. A method as in claim 9 wherein said providing step (v) includes the step of apportioning said payment amongst said at least first and second owners according to actual use of said at least first and second portions of said database contents.

11. A method as in claim 10 further including requiring said payment in an amount based, at least in part, on said metering.

12. A method as in claim 1 wherein:
 said providing step (i) includes providing at least one index and at least one database searching mechanism;
 said method further includes supporting, with said database protection system, storing of customer accessible budget information for use of at least a portion of said database; and
 said method further includes providing said budget information to assist said customer in controlling use of at least a portion of said database.

13. A method as in claim 1 wherein:
 said providing step (ii) includes providing an enclosed, tamper resistant hardware arrangement for use in proximity to said at least one storage medium; and
 said method further includes securely performing the following steps within said hardware arrangement:
  (a) storing information representing said supplied key;
  (b) said decrypting step (v);
  (c) metering at least one parameter pertaining to at least one aspect of at least one of (a) displaying, (b) copying, (c) decrypting, (d) retrieving, and (e) communicating, said stored database; and
  (d) storing information in response to at least a portion of said metering.

14. A method as in claim 1 wherein:
 said providing step (ii) includes providing a tamper resistant, enclosed, preprogrammed hardware arrangement for operation in proximity to said storage medium, said arrangement including non-volatile memory; and
 said method further includes the following steps:
  storing information in said non-volatile memory, said information including at least one of (a) password information, and (b) user identification information;
  storing, in said non-volatile memory, information representing said supplied key; and
  decrypting an encrypted part of said database within said hardware arrangement using said decryption key.

15. A method as in claim 1 wherein:
 said providing step (ii) includes the step of supplying within an integrated circuit special purpose, programmable, tamper resistant circuitry arrangement, said circuitry, at least in part, securing against said unauthorized use of at least a portion of said database; and
 said method further includes the steps of:
 (a) storing in non-volatile memory within said circuitry, at least one of (a) password information, and (b) user identification information;
 (b) storing in said non-volatile memory, information related to authorization for said customer to use a specific part of said database;
 (c) at least in part performing said decrypting step within said circuitry; and
 (d) storing, within said circuitry, information based on at least part of said customer's use of at least a portion of said database.

16. A method as in claim 1 wherein:
 said providing step (ii) includes providing an, at least in part, special purpose, tamper resistant, programmable, integrated circuit arrangement for at least in part securing distribution of at least a portion of said database; and
 said method further includes the following steps:
  (i) securely controlling within said special purpose tamper resistant arrangement, the metering of at least one parameter pertaining to at least one portion of at least one of (a) copying, (b) displaying, (c) decrypting, (d) retrieving, and (e) communicating, at least one portion of said stored database;
  (ii) securely controlling within said special purpose tamper resistant arrangement the decrypting of at least a portion of said at least one encrypted portion; and
  (iii) securely storing (A) information indicative of said metering, and (B) said key, within said special purpose tamper resistant arrangement.

17. A method as in claim 1 wherein:
 said providing step (ii) includes providing at least one special purpose integrated circuit, for, at least in part, providing a secure, tamper resistant, database distribution environment; and
 said method further includes:
 securely controlling within said integrated circuit, the monitoring of at least one parameter pertaining to at least one aspect of at least one portion of at least one of (a) copying, (b) displaying, (c) decrypting, (d) retrieving, and (e) communicating, said stored database;
 securely controlling, within said integrated circuit the decrypting of at least a portion of said at least one encrypted portion; and
 securely storing within said at least one special purpose integrated circuit, (i) information resulting from said monitoring, and (ii) said key.

18. A method as in claim 1 wherein said decrypting step (v) decrypts database information to provide decrypted information, and wherein said limiting step (iv) includes preventing usage of at least a portion of said decrypted information.

19. A method as in claim 1 wherein:
said method includes a step of displaying at least a portion of said database; and
said limiting step (iv) includes preventing at least one of (a) printing, (b) copying, and (c) communicating, of at least one portion of said displayed database.

20. A method as in claim 1 wherein:
said method further includes the step of enabling said customer to establish at least one budget limiting use of at least one portion of said database contents by at least one employee of said customer;
said limiting step includes limiting use of at least a portion of said database contents based, at least in part, on said budget; and
said method further includes enabling said customer's at least one employee to access at least at portion of said database contents over a local area network installed at said customer's site.

21. A method as in claim 1 wherein said method further includes the step of providing said customer with an authorization to use at least a portion of said database until a certain point-in-time; and
said limiting step (iv) includes conditionally limiting at least one aspect of said customer's use of at least one portion of said database, in response to said point-in-time.

22. A method as in claim 1 further including providing:
(a) a first budget relating to said customer displaying at least a part of said database, and
(b) a second budget different from said first budget, said second budget for at least one of (a) printing at least a part of said database, (b) copying at least a part of said database, and (c) communicating at least part of said database to a site different from said customer site.

23. A method as in claim 1 further including the step of subjecting said customer to different fee rates for (i) allowing the display of a portion of said database, and (ii) allowing at least one of (a) printing, (b) copying, and (c) communicating to a location different from said customer site, of at least a portion of said displayed portion of said database.

24. A method as in claim 1, further including:
(a) creating at least one audit trail which tracks at least one aspect of use of at least a part of said database contents, and
(b) deriving marketing survey information from at least a portion of said at least one audit trail.

25. A method as in claim 1 wherein said method further includes:
conveying information concerning use of at least a portion of said database to a remotely located publisher; and
securing against the tampering with said information conveyed by said conveying step.

26. A method as in claim 1 further including the step of enabling database searching that identifies a specific portion of said database based on said portion's topical relationship to, at least in part, customer specified search criteria.

27. A method as in claim 1 wherein said method further include the step of providing said customer with an authorization to use at least a portion of database for a duration of time; and
said limiting step (iv) includes conditionally limiting at least one aspect of said customer's use of at least one portion of said database, in response to said duration of time.

28. A method as in claim 1 wherein:
said database protection system providing step includes providing an integrated circuit, that is at least in part tamper-resistant, for location in proximity to said at least one storage medium;
said decrypting step (v) comprises at least in part decrypting, within said integrated circuit, at least a part of said encrypted portion; and
said method further includes:
(a) securely storing information related to customer identification, using a non-volatile memory arrangement within said integrated circuit;
(b) securely storing, using said non-volatile memory arrangement within said integrated circuit, information related to an authorization for said customer to use at least one of:
(A) a specific part of said database, and
(B) at least a part of said database up to a quantity limit; and
(c) securely storing, using a non-volatile memory arrangement within said integrated circuit, a value at least in part related to metering of at least an aspect of said use.

29. A method as in claim 28 further including coupling said tamper-resistant module to a general purpose host computer, and performing tasks with said general purpose host computer other than tasks associated with distributing said database.

30. A method as in claim 28 wherein:
said method includes the step of displaying at least a portion of said database and;
said limiting step (iv) includes preventing at least one of (a) printing, (b) copying, and (c) communicating, of at least one portion of said displayed database portion.

31. A method as in claim 28, wherein:
said method further including enabling said customer to specify, for at least one customer employee, at least one parameter for an authorization for said at least one employee to use of at least one portion of said database;
said limiting step conditionally prevents said employee from using at least a portion of said database based at least in part on said authorization;
said method further includes having a least one of said at least one storage medium installed on a local area network; and
said method further includes enabling said employee to access said network installed storage medium.

32. A method as in claim 28 wherein said method further includes the step of providing said customer with an authorization to use at least a portion of database for a duration of time; and
said limiting step (iv) includes conditionally disabling at least one aspect of said customer's use of at least one portion of said database, in response to said duration of time.

33. A method as in claim 28 wherein:
said method further includes the step of providing said customer with an authorization to use at least a portion of said database until a certain point-in-time; and
said limiting step (iv) includes conditionally disabling at least one aspect of said customer's use of at least one portion of said database in response to said provided authorization.

34. A method as in claim 28 further including providing (a) a first budget for said customer for the displaying of database, and (b) a second budget different from said first budget, said second budget for at least one of (a) printing database, (b) copying databases, and (c) communicating database contents to a site different from said customer site.

35. A method as in claim 28 further including the step of subjecting said customer to different fee rates for (i) allowing the display of a portion of said database, and (ii) for allowing at least one of (a) printing, (b) copying, and (c) communicating to a location different from said customer site location, of at least a portion of said displayed portion of said database.

36. A method as in claim 28, further including:
   (a) creating at least one audit trail which tracks at least one aspect of use of at least a port of said database contents, and
   (b) deriving marketing survey information from at least a portion of said at least one audit trail.

37. A method as in claim 28, wherein:
   said method further includes the step of enabling said customer to specify, at said customer's site, at least one budget establishing at least one maximum quantity limit for use of at least one portion of said database by at least one of said customer's employees; and
   said limiting step (iv) conditionally enables use of at least a portion of said database based at least in part on said maximum quantity limit.

38. A method as in claim 28, further including the step of making a copy of at least one portion of said database, said copying step including providing in said copy at least one embedded, copy origin identifying code.

39. A method as in claim 28 wherein said method further includes:
   conveying information concerning use of said database to a remotely located publisher; and
   securing against the tampering with said information conveyed by said conveying step.

40. A method as in claim 28 further including the step of enabling database searching that identifies a specific portion of said database based on said portion's topical relationship to, at least in part, customer specified search criteria.

41. A method as in claim 28 further including metering, within a tamper resistant portion of said integrated circuit, at least one parameter pertaining to at least one aspect of at least one portion of said decrypting, said metering step including storing information related to said metering in non-volatile memory within a tamper resistant portion of said integrated circuit.

42. A method as in claim 28 further including having at least one of said at least one storage medium installed on a local area network, said step including enabling said user to access said at least one of said at least one storage medium over said local area network.

43. A method as in claim 28 wherein:
   said securely storing step (a) includes storing at least one identification code in non-volatile memory within a tamper resistant portion of said integrated circuit; and
   said method further includes:
      embedding said at least one code corresponding to said identification code in at least one portion of said database, and
      controlling use of at least a portion of said database based on the presence of said embedded at least one code.

44. A method as in claim 43 further including the steps of:
   a. ascertaining, at least in part based on the presence of said embedded code, how an unauthorized copy of said embedded database portion came into being; and
   b. enforcing copyright law based, at least in part, on results of said ascertaining step.

45. A method as in claim 28 wherein said method further includes:
   providing a self-destruct mechanism, and
   destroying, through the use of said self-destruct mechanism, at least a portion of said stored information in response to tampering.

46. A method as in claim 28 wherein said method further includes storing billing information within said integrated circuit, at least a portion of said billing information being calculated based on at least one portion of information produced by said metering and at least one predetermined billing rate.

47. A method as in claim 28 further including:
   (a) generating information indicating use of said encrypted database portion; and
   (b) processing at least a portion of said produced information to generate marketing survey information.

48. A method as in claim 1, wherein
   said method further includes providing said customer at least one authorization to use at least one portion of said database; and
   said providing step (ii) comprises:
      supplying a tamper resistant, at least in part preprogrammed, hardware arrangement to secure against unauthorized at least one of (a) displaying, (b) communicating, (c) copying, and (d) printing, of at least one portion of said database;
      securely controlling, within said hardware arrangement, at least a portion of said decrypting step;
      metering, at least in part within said hardware arrangement, at least one parameter pertaining at least one aspect of at least one of (a) a portion of the decrypting of said stored database, and (b) use of at least a portion of said database; and
      securely, storing within said hardware arrangement, (i) information resulting from said metering step, and (ii) authorization information.

49. A method as in claim 48 wherein said method further includes supplying said ·tamper resistant arrangement for installation within a general-purpose host computer.

50. A method as in claim 48 wherein:
   said method further includes enabling said customer to specify, for at least one customer employee, an authorization for said employee to copy at least one portion of said database contents;
   said limiting step includes conditionally restricting said employee from copying at least a portion of said database contents based at least in part on said authorization; and
   said storing step further includes storing, within said hardware arrangement, information related to said authorization.

51. A method as in claim 48, further including:

(a) creating at least one audit trail which tracks at least one aspect of use of at least a part of said database contents, and (b) deriving marketing survey information from at least a portion of said at least one audit trail.

52. A method as in claim 48 further including the step of making a copy of at least one portion of said database, said copying step including providing in said copy at least one embedded, copy origin identifying code.

53. A method as in claim 48 further including the step of enabling database searching that identifies specific portions of said database contents based on topical relationship to, at least in part, customer specified search criteria.

54. A method as in claim 48 wherein:
said metering step comprises, at least in part, metering, within said arrangement, at least a portion of said decrypting of at least a portion of said database contents using said securely stored key; and
said securely storing step comprises, at least in part, storing within said arrangement, information related to at least one aspect of said metering step.

55. A method as in claim 1 wherein said customer is an organization with employees, and wherein said method further includes:
storing usage information within said database protection system, said usage information reflecting database usage related to a database usage parameter, wherein said usage information is determined from database usage by a plurality of said customer's employees; and
enabling, through the use of said database protection system, said customer to establish different usage budgets associated with said usage parameter, said different usage budgets applying at least in part to usage by different customer employees,
wherein said limiting step (iv) includes limiting an aspect of said database usage based at least in part on said usage budgets.

56. A method as in claim 1, wherein said method further includes storing, at said customer's site and within said database protection system, a plurality of user identifications, wherein said user identifications correspond to individual organization employees and wherein said limiting step (iv) includes providing individual organization employees with budgets limiting said employees' usage of said database.

57. A method as in claim 1 wherein said method includes the steps of:
metering at least one parameter related to use of said database;
storing information derived from said metering in a detachable memory module operatively connected to and detachable from said database protection system; and
using data stored in said detachable memory module for the purpose of determining, at least in part, a usage history for said customer.

58. A method as in claim 1 wherein:
said database first and second parts comprise discrete database properties;
said customer comprises an organization having employees;
said limiting step (iv) comprises the following steps:
(a) enabling a publisher of said database to specify at least a first limit for usage of at least a portion of said database, and (b) enabling said customer to establish at least a second limit for usage of at least a portion of said database; and (c) limiting usage of at least a portion of said database based, at least in part, on at least one of said first and second limits.

59. A database protection system for securely distributing a database, said system preventing unauthorized use of at least a portion of said database, said system comprising:
at least one storage medium physically disposed at a customer's site, said storage medium storing at least a portion of said database, said database containing properties, at least a portion of said database being encrypted, said encrypted portion requiring processing with at least one key for authorized use; and
a digital processing arrangement, disposed at said customer's site and operatively connected to said storage medium, said processing arrangement including:
(a) control logic allowing said customer to select and use at least one part of at least one of said database properties, said control logic selectively processing, using said at least one key, at least one part of said encrypted portion of said stored database;
(b) means for storing, at said customer's site, at least one value related to metering of at least one aspect of use of at least a portion of said database properties, said storing means including means for storing, at said customer's site, limit information related to limiting at least one aspect of said customer's use of said database properties, wherein at least a portion of said stored limit information is accessible to said customer; and
means for determining payment required from said customer for use of at least one portion of said database.

60. A system as in claim 59 wherein said system further includes embedding means for embedding, into a copy of at least one portion of said database, at least one origin identify code.

61. A system as in claim 59 wherein said system further includes:
a tamper resistant, hardware module to be located in proximity to said at least one storage medium, said tamper resistant hardware module means incorporating to:
(a) store, on a non-volatile memory arrangement within said hardware module, at least one of (a) password information, and (b) user identification information;
(b) store, on a non-volatile memory arrangement within said hardware module, information related to an authorization for said customer to use at least one of (i) a specific part of said database, and (ii) at least a portion of said database up to a quantity limit for at least one aspect of said customer use; and
(c) perform said selective processing step (iii).

62. A system as in claim 59, wherein: said system further includes:
access enabling means for enabling said storage medium to be accessed over a local area network installed at said customer's site, and
budget means for enabling said customer to establish at least one budget limiting use of at least one portion of said database contents by at least one employee of said customer; and said digital processor arrangement includes:
means for preventing use of at least a portion of said database contents based, at least in part, on said budget, and
means for enabling said customer's at least one employee to access at least at portion of said database contents over said local area network.

63. A system as in claim 59, said system further including means for applying different fee rates for allowing the display of a portion of said databases, and for allowing at least one of (a) printing, (b) copying, and (c) communicating to a location different from said user location, of at least a portion of said displayed portion of said database.

64. A system as in claim 59, wherein:
said system further includes means for displaying at least a portion of said database; and
said digital processing arrangement includes means for selectively preventing at least one of (a) printing, (b) copying, and (c) communicating, of at least one portion of said displayed database.

65. A system as in claim 59 wherein said system further includes means to securely perform within an enclosed, tamper resistant special purpose integrated circuitry hardware arrangement located in proximity to said at least one storage medium the following:
(a) storing information representing said supplied at least one key;
(b) metering at least one aspect of at least a portion of said customer use of said stored database; and
(c) storing information in response to at least a portion of said metering.

66. A system as in claim 59 further including means for enabling database searching that identifies specific portions of said database based, at least in part, on said specific portion's topical relationship to, at least in part, user specified search criteria.

67. A system as in claim 59 wherein said use includes copying.

68. A system as in claim 59 wherein said system further includes:
means for storing, at a database distributor site which is remote to said customer, database information related to said database stored at said customer location; and
means for retrieving database information from (a) said distributor site, and (b) said storage medium, based at least in part, on customer specified criteria.

69. A method as in claim 59 wherein said tamper resistant hardware element comprises a dedicated browsing workstation.

70. A system as in claim 59 wherein said system includes means for establishing limit information, including at least one limit on cumulative usage of logically related portions of said database, and wherein said control logic includes:
means for determining whether the usage of at least one database portion, in combination with usage of database portions previously used by said user, will exceed a limit specified by said limit information on the use of database portions that have a certain logical relationship; and
means for selectively limiting usage of at least a portion of said at least one database portion if said determining means determines that useage of said at least one database portion exceeds at least one limit on the usage of database portions that have said certain logical relationship.

71. A system as in claim 59 wherein said control logic includes means for selectively limiting use of more than a certain quantity of contiguous database information.

72. A system as in claim 59 wherein:
said database comprises first and second discrete database properties;
said customer comprises an organization having employees;
said system further includes:
means for enabling a publisher of said database to specify at least a first limit, and
means for enabling said customer to establish at least a second limit; and
said control logic includes means for limiting usage of at least a portion of said database based, at least in part, on at least one of said first and second limits.

73. A method of securely distributing an encrypted database portion, said method comprising:
providing, for use at a user location, at least one storage medium having an encrypted database portion stored thereon;
selecting at least a part of said encrypted database portion;
supplying a database protection arrangement for use at said user location in conjunction with said storage medium, said supplied database protection arrangement including a tamper resistant hardware element, said database protection arrangement performing the following steps:
(a) storing, at least in part within said hardware element, information representing, at least in part, at least one key;
(b) selectively processing, at least in part within said hardware element and with said stored key, at least a portion of said selected part of said encrypted database portion so as to provide useable information;
(c) metering, at least in part within said hardware element, at least one parameter related to at least one aspect of use of at least a part of said encrypted database portion; and
(d) storing, within said hardware element, information based on at least a portion of said metering.

74. A method as in claim 73 further including providing (a) a first budget for said customer for the displaying of at least a portion of said database, and (b) a second budget different from said first budget, said second budget for at least one of (a) printing at least a portion of said database, (b) copying at least said portion of said database, and (c) communicating at least said portion of said database to a site different from said customer site.

75. A method as in claim 73, wherein:
said method further includes the step of enabling said customer to specify, at said customer's site, at least one budget establishing at least one maximum quantity limit for use of at least one portion of said database by at least one of said customer's employees; and
said processing step (b) conditionally enables use of at least a portion of said database based at least in part on said maximum quantity limit.

76. A method as in claim 73, further including updating said authorization from a location distant from said customer site.

77. A method as in claim 73 wherein:

said selectively processing step includes decrypting, within said arrangement, at least a portion of said encrypted database portion using said securely stored key, and said metering step includes:
metering, within said hardware element, at least one aspect of said decrypting step; and
storing, within said hardware element, information based at least in part on said metering.

78. A method as in claim 73 further including:
coupling said tamper resistant hardware element to a general purpose host computer, and
performing tasks with said general purpose host computer other than tasks associated with distributing said encrypted database portion.

79. A method as in claim 73 wherein said supplying step comprises supplying a special purpose arrangement for securing against unauthorized distribution of at least a portion of said protected database portion.

80. A method as in claim 73 wherein:
(i) said supplying step comprises supplying special purpose integrated circuitry dedicated to securely distributing at least a portion of said encrypted database portion;
(ii) said selectively processing step comprises decrypting said at least a portion of said selected part; and
(iii) said method includes the step of performing said metering step (c) at least in part within said special purpose integrated circuitry, said metering step comprising metering at least one aspect of said decrypting step, and said storing step (d) comprises storing information related to said metering within said special purpose integrated circuitry.

81. A method as in claim 73, wherein said method further includes the step of said user specifying, at said user's location, at least one limitation for use of at least said selected database portion by said user; and
said selectively enabling step selectively does not permit at least one of (a) copying of, and (b) use of, at least said selected database portion based at least in part on said specified at least one limitation.

82. A method as in claim 73 further including the step of searching said database to identify at least a part of said encrypted database portion based, at least in part, on said part's topical relationship to user specified search criteria.

83. A method as in claim 73 wherein said database portion includes plural properties.

84. A method as in claim 73, further including:
(a) creating at least one audit trail which tracks at least one aspect of use of said protected database part, and
(b) deriving marketing survey information from at least a portion of said at least one audit trail.

85. A method as in claim 73 wherein:
said method further includes the step of providing said customer with an authorization to use at least a portion of said database portion at least one of (i) until a certain point-in-time, and (ii) for a certain duration of time; and
said selectively processing step includes conditionally limiting at least one aspect of said customer's use of at least said database portion in response to said provided authorization.

86. A method as in claim 73 further including:
storing at least one identification code in non-volatile memory within said hardware element;
embedding at least one code corresponding to said identification code in at least one portion of said encrypted database portion; and
controlling use of at least a portion of said encrypted database portion based on the presence of said codes.

87. A method as in claim 86 further including the steps of:
a. ascertaining, at least in part based on the presence of said embedded code, how an unauthorized copy of at least a part of said encrypted database portion came into being; and
b. enforcing copyright law based, at least in part, on results of said ascertaining step.

88. A method as in claim 73 wherein said method further including:
storing at a database distributor site which is remote to said user, database information related to said encrypted database portion stored at said user location; and
retrieving database information from (a) said distributor site, and (b) said user location, based, at least in part, on user specified criteria.

89. A method as in claim 73 wherein said method further includes:
storing further database information at a site remote to said user location;
communicating at least a portion of said further database information to said user location.

90. A method as in claim 73 wherein said supplying step includes providing said tamper-resistant hardware element in a sealed module that impedes unauthorized usage of said database.

91. A method as in claim 90 wherein said method further includes providing said seal, at least in part, for evidencing tampering attempts.

92. A method as in claim 73 wherein said method further includes disabling said selectively processing step in response to said customer attempting to exceed authorized usage levels.

93. A method as in claim 73 wherein said method further includes:
(1) providing a self-destruct mechanism,
(2) destroying, through the use of said self-destruct mechanism, at least a portion of said information representing, at least in part, at least one key.

94. A method as in claim 93 wherein said destroying step comprises destroying at least a part of said encrypted database portion.

95. A method as in claim 73 wherein said method further includes:
providing a self-destruct mechanism; and
destroying through the use of said self-destruct mechanism, a critical part of said database protection arrangement in response to tampering with said database protection arrangement.

96. A method as in claim 73 wherein said tamper resistant hardware element includes display driving means.

97. A method as in claim 73 wherein said user is an organization with employees, said method further including:
storing usage information within said database protection arrangement, said usage information reflecting database usage related to a database usage parameter, wherein said usage information is determined from database usage by a plurality of said organization's employees; and enabling, through the use of said database protection arrangement said organization to establish different usage budgets associated with said usage parameter, said different usage budgets applying to at least one of (a) different said employees, and (b) different groups of said employees, wherein said selectively processing step includes limiting an aspect of said database usage based at least in part on said organization established usage budgets; and enabling a publisher of at least a portion of said encrypted database portion to establish a usage budget based on said parameter, wherein said selectively processing step further includes limiting at least one aspect of said organization's use of said database based, at least in part, on said publisher established usage budget.

98. A method as in claim 73, wherein said method further includes enabling a publisher of at least a portion of said encrypted database portion to establish a usage budget based on said parameter, wherein said selectively processing step includes limiting at least one aspect of said customer's use of said database based, at least in part, on said usage budget.

99. A method as in claim 73 wherein said method further includes storing billing information within said tamper resistant hardware element, at least a portion of said billing information being calculated based on at least one portion of metering information produced by said metering step (c) and at least one predetermined billing rate.

100. A method as in claim 73, wherein said tamper resistant hardware element includes modem circuitry, and said method further includes communicating, to a remote location, at least in part, through the use of said modem circuitry, usage information based at least in part on said metering step (c).

101. A method as in claim 73 wherein said method includes:

metering at least one aspect of use of said encrypted database portion and wherein said selectively processing step (b) includes allowing flat fee database usage for a first portion of said encrypted database portion, and allowing, for a second portion of said encrypted database portion that is different from said first portion, usage-based billing, wherein the financial cost of said second portion usage is calculated, at least in part, at said user location based at least in part on said metering step (c).

102. A method as in claim 73 wherein said method includes establishing limit information including at least one limit on cumulative usage of logically related portions of said encrypted database portion, and wherein said selectively processing step (b) includes:

(1) determining whether the usage of at least one portion of said encrypted database portion, in combination with usage of at least one portion of said encrypted database portion previously used by said user, will exceed a limit specified by said limit information on the use of portions of said encrypted database portion that have a certain logical relationship; and (2) selectively limiting usage of at least a portion of said at least one encrypted database portion if said determining step (1) determines that usage of said at least one portion of said encrypted database portion exceeds at least one limit on the usage of portions of said encrypted database portion that have said certain logical relationship.

103. A method as in claim 73 wherein:

said metering step (c) includes generating information indicating use of said database; and said method further includes processing at least a portion of said generated information to generate marketing survey information.

104. A method as in claim 73 wherein:

said encrypted database portion comprises plural discrete database properties;

said customer comprises an organization having employees;

said method further includes the following steps:
 (a) enabling a publisher of said database to specify at least a first limit, and
 (b) enabling said customer to establish at least a second limit; and said selectively processing step (b) includes limiting usage of at least a portion of said database based, at least in part, on at least one of said first and second limits.

105. A method as in claim 73 wherein said digital processing arrangement comprises a dedicated browsing workstation.

* * * * *